(12) United States Patent
Kawamura et al.

(10) Patent No.: US 10,651,954 B2
(45) Date of Patent: May 12, 2020

(54) CALIBRATION SYSTEMS AND CALIBRATION METHOD

(71) Applicant: ANRITSU CORPORATION, Kanagawa (JP)

(72) Inventors: Takashi Kawamura, Kanagawa (JP); Masaaki Fuse, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/376,610

(22) Filed: Apr. 5, 2019

(65) Prior Publication Data

US 2019/0334635 A1  Oct. 31, 2019

(30) Foreign Application Priority Data

Apr. 27, 2018 (JP) ................................ 2018-087274

(51) Int. Cl.
*H04M 1/00* (2006.01)
*H04B 17/12* (2015.01)
(Continued)

(52) U.S. Cl.
CPC ............. *H04B 17/12* (2015.01); *H04B 5/02* (2013.01); *H04B 7/0691* (2013.01); *H04B 17/14* (2015.01); *H04B 17/16* (2015.01)

(58) Field of Classification Search
CPC ........ H04B 17/12; H04B 17/14; H04B 17/16; H04B 5/02; H04B 7/0691
(Continued)

(56) References Cited

U.S. PATENT DOCUMENTS 5,805,067 A * 9/1998 Bradley ............... H04B 1/3838
340/635
8,170,503 B2 * 5/2012 Oh ........................ H04B 7/061
455/103
(Continued)

FOREIGN PATENT DOCUMENTS

JP         3491038 A      1/2004

OTHER PUBLICATIONS

Mano, Seiji, et al., "A Method for Measuring Amplitude and Phase of Each Radiating Element of a Phased Array Antenna", Transactions of the Institute of Telecommunications, vol. J-65-B, No. 5, pp. 555-560, May 1982.

*Primary Examiner* — Edward F Urban
*Assistant Examiner* — Max Mathew
(74) *Attorney, Agent, or Firm* — Pearne & Gordon LLP

(57) ABSTRACT

To provide a calibration system and a calibration method capable of measuring the amplitude and the phase of the radio signal on the electromagnetic radiation surface of the measured antenna, even in the case where the interval between antenna elements is narrow. The calibration system 1 includes: an antenna control unit 16 that selects and excites a combination of antenna elements from among a plurality of antenna elements provided in the measured antenna 100 and thereafter selects and excites another combination of antenna elements; and a probe antenna 12 that receives an electromagnetic wave of the radio signal transmitted from the combination of the antenna elements at a plurality of measurement positions set within a predetermined measurement plane P of the near field area of the measured antenna 100, each time a combination of the antenna elements selected by the antenna control unit 16 are switched.

20 Claims, 23 Drawing Sheets

Amplitude (Initial Value)

(51) Int. Cl.
  *H04B 17/16*  (2015.01)
  *H04B 7/06*  (2006.01)
  *H04B 5/02*  (2006.01)
  *H04B 17/14*  (2015.01)
(58) Field of Classification Search
  USPC .............................. 455/562.1, 129, 262, 279
  See application file for complete search history.

(56) References Cited

U.S. PATENT DOCUMENTS

| | | | |
|---|---|---|---|
| 8,781,407 B2 * | 7/2014 | Inoue ...................... | H01Q 3/26 |
| | | | 375/267 |
| 8,934,942 B2 * | 1/2015 | Petersson ............. | H04B 7/0626 |
| | | | 455/272 |
| 8,942,653 B2 * | 1/2015 | Ahn ........................ | H01Q 3/30 |
| | | | 455/129 |
| 10,211,527 B2 * | 2/2019 | Safavi-Naeini ........ | H01Q 3/267 |
| 10,439,280 B1 * | 10/2019 | Kawamura ............... | H01Q 3/00 |
| 2011/0045768 A1 * | 2/2011 | Keerthi .................. | H01Q 19/12 |
| | | | 455/39 |
| 2011/0151779 A1 * | 6/2011 | Bongfeldt ............ | H01Q 1/1242 |
| | | | 455/39 |
| 2013/0115886 A1 * | 5/2013 | Khan ...................... | H01Q 3/26 |
| | | | 455/42 |
| 2017/0222735 A1 * | 8/2017 | Kawamura .......... | H04B 17/102 |
| 2017/0336454 A1 * | 11/2017 | Hinotani ................ | G01R 29/10 |
| 2018/0091240 A1 * | 3/2018 | Noda ................... | H04B 17/102 |
| 2019/0285679 A1 * | 9/2019 | Jue ........................ | H04B 17/13 |
| 2019/0334565 A1 * | 10/2019 | Itkin ...................... | H04B 17/12 |
| 2019/0349048 A1 * | 11/2019 | Huang .................... | H04B 7/08 |

* cited by examiner

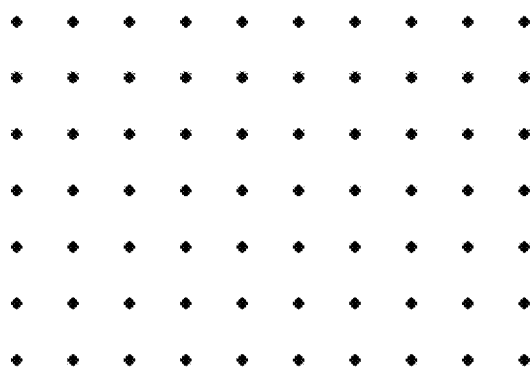
FIG.5A Square Lattice
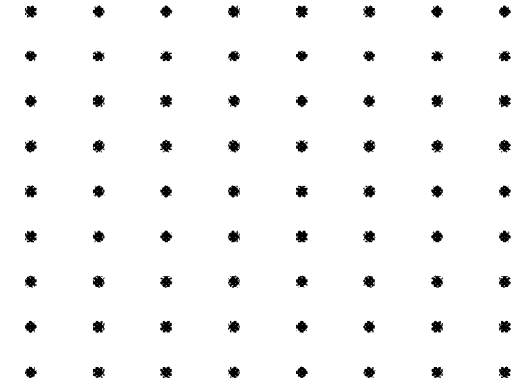
FIG.5B Rectangular Lattice
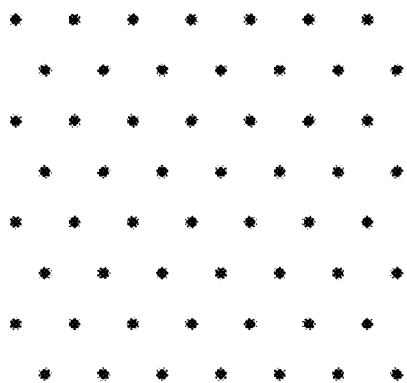
FIG.5C Hexagonal Lattice
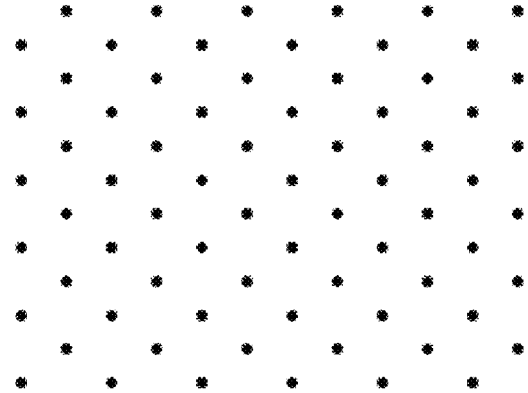
FIG.5D Orthorhombic Lattice
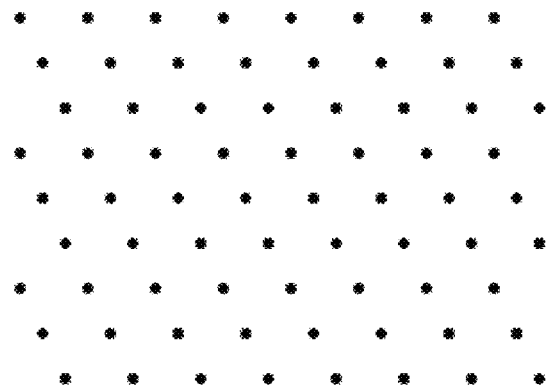
FIG.5E Parallel Body Lattice

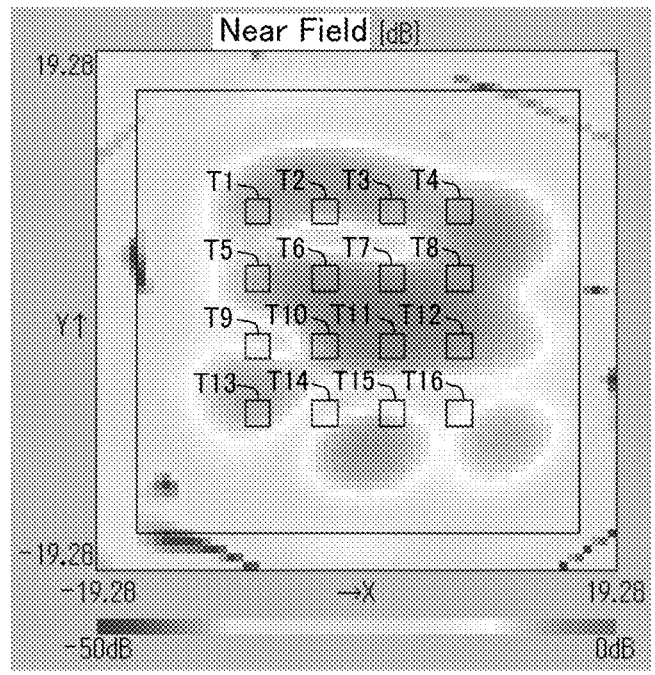
FIG.7A  Amplitude (Initial Value)
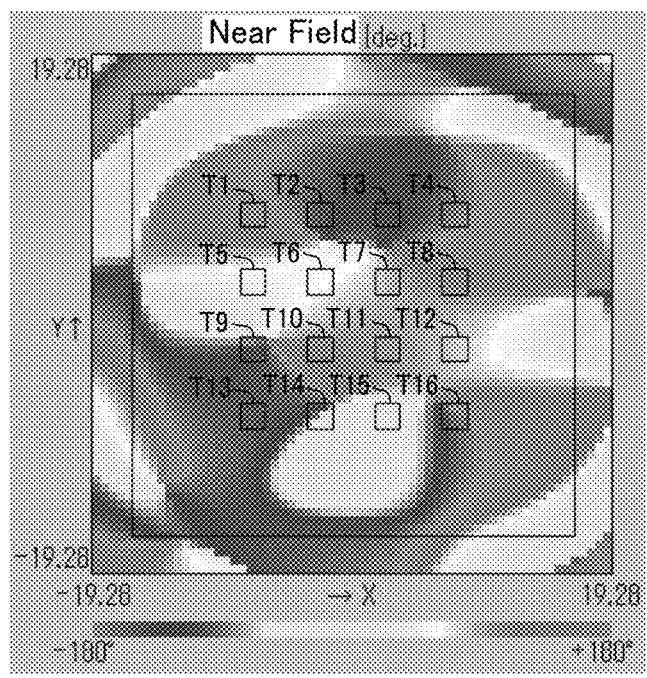
FIG.7B  Phase (Initial Value)

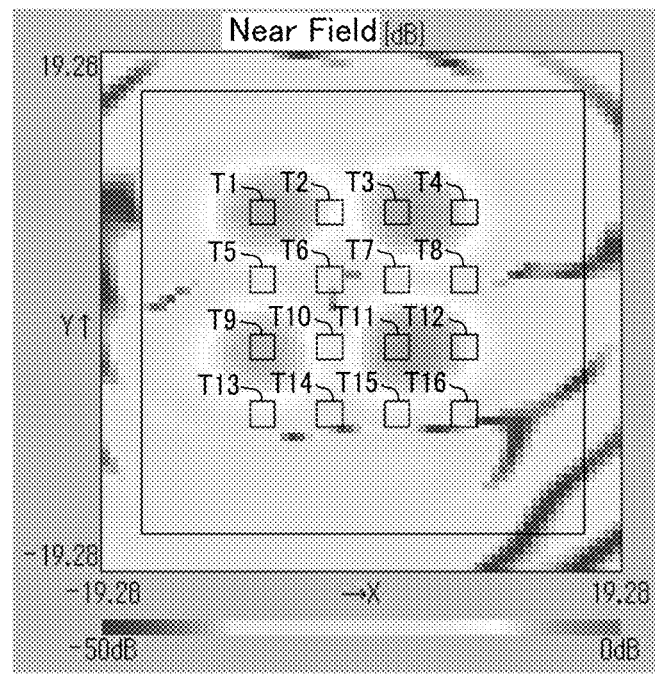
FIG.8A  Amplitude (Combination 1)
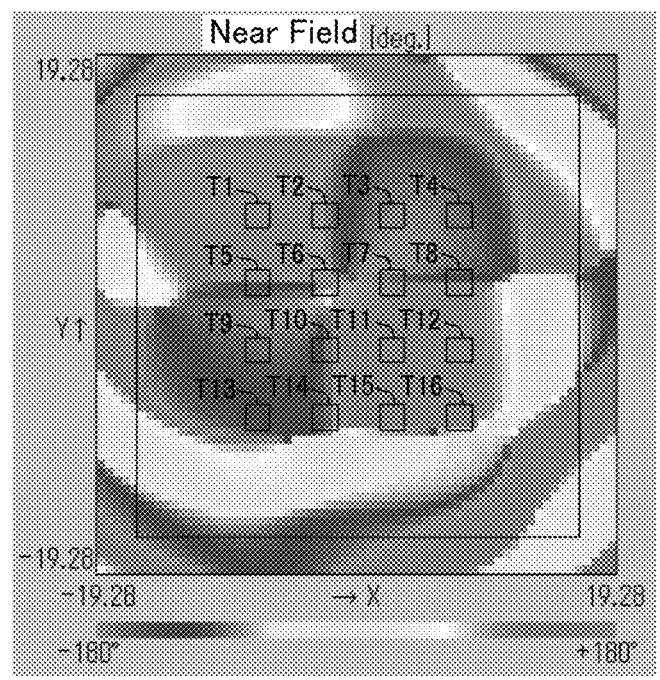
FIG.8B  Phase (Combination 1)

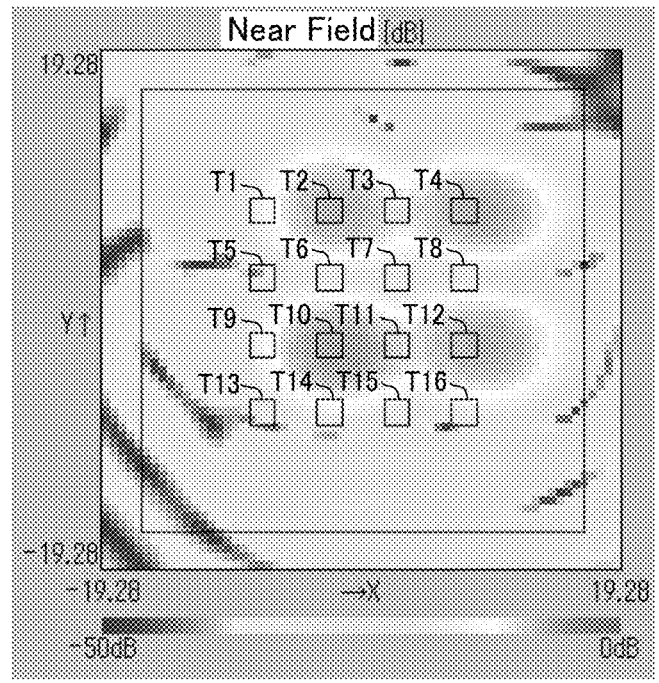
FIG.9A  Amplitude (Combination 2)
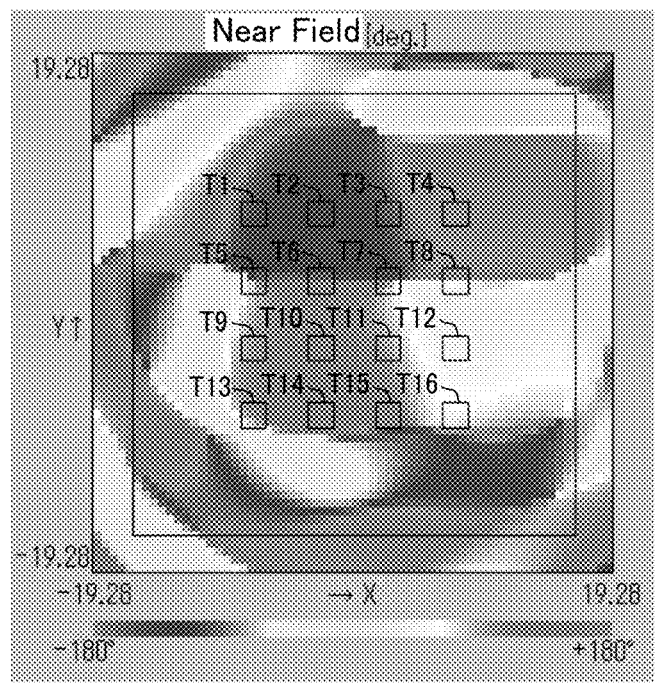
FIG.9B  Phase (Combination 2)

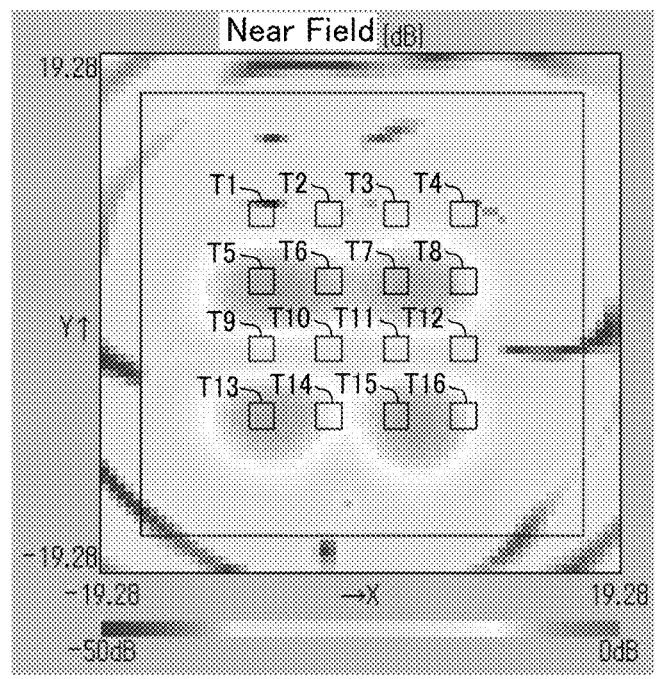
FIG.10A  Amplitude (Combination 3)
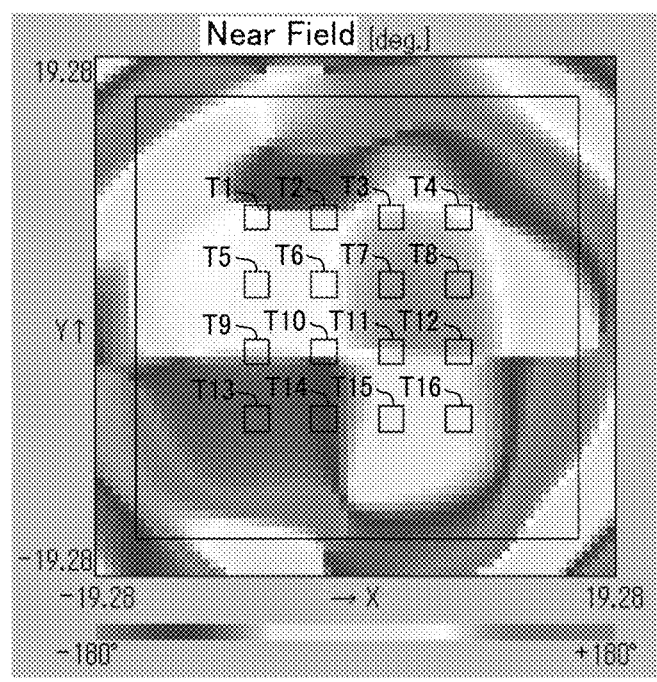
FIG.10B  Phase (Combination 3)

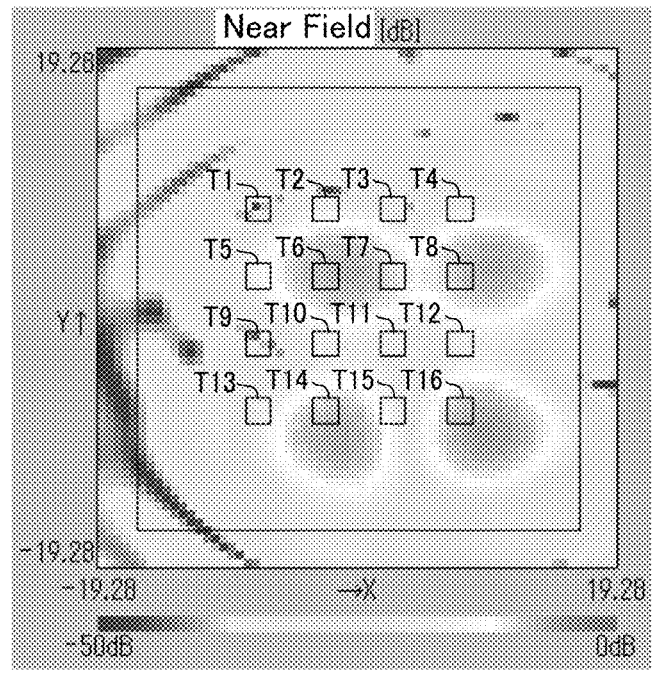
FIG.11A Amplitude (Combination 4)
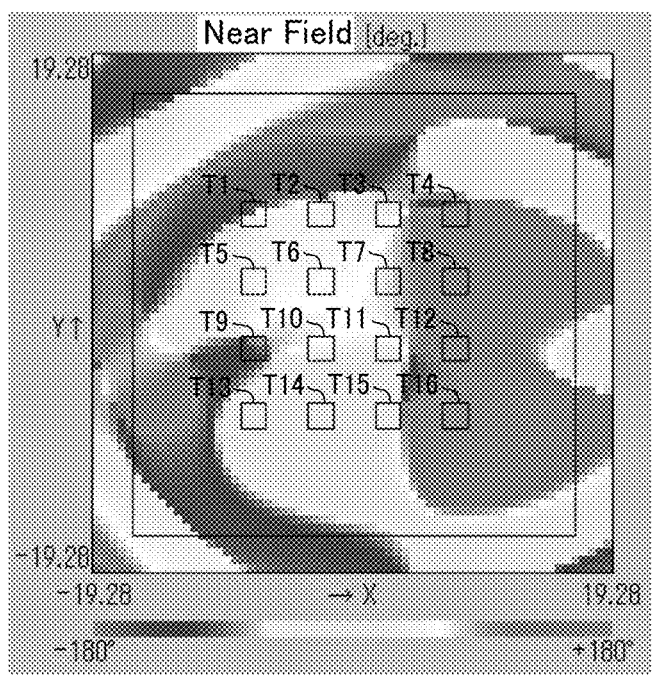
FIG.11B Phase (Combination 4)

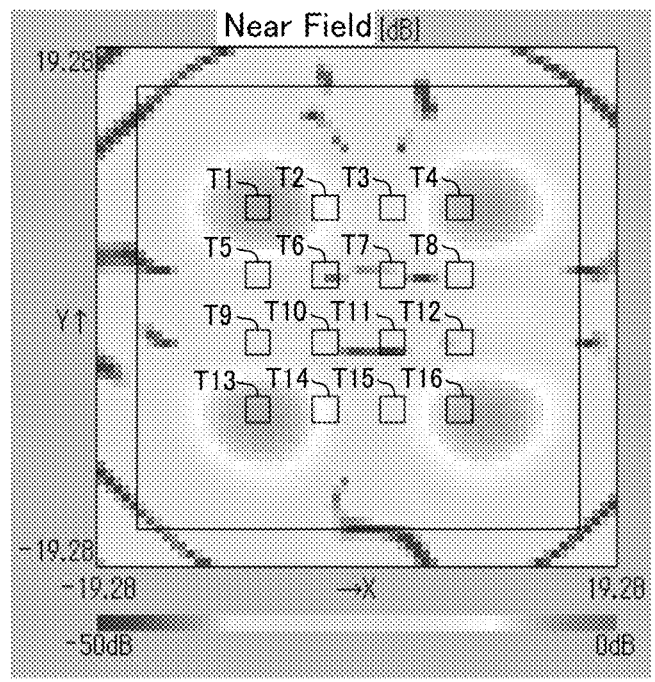
FIG.12A  Amplitude (Combination 5)
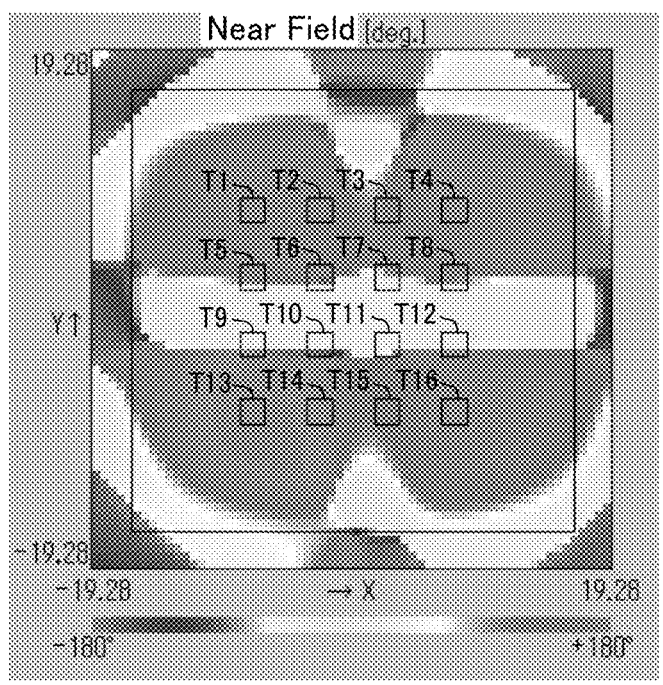
FIG.12B  Phase (Combination 5)

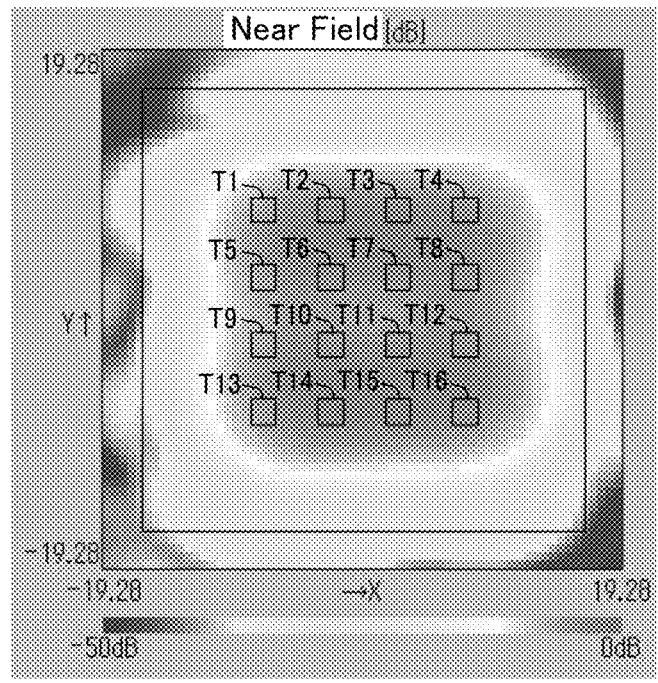
FIG.13A  Amplitude
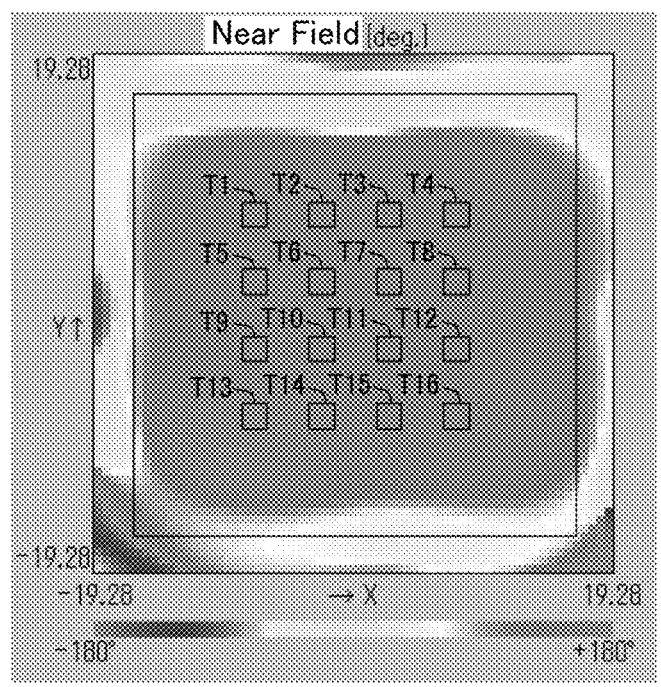
FIG.13B  Phase

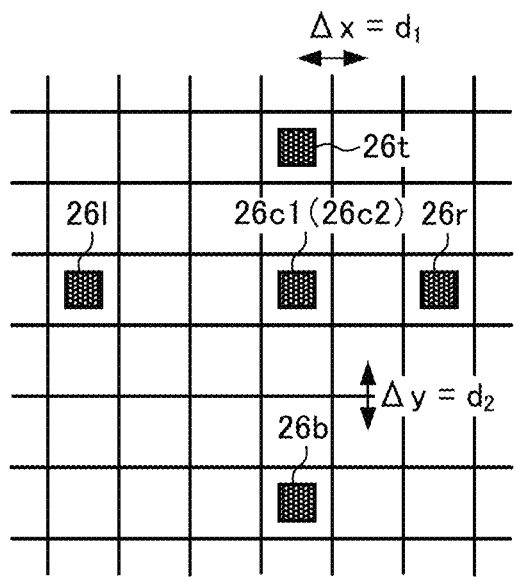
FIG.20A
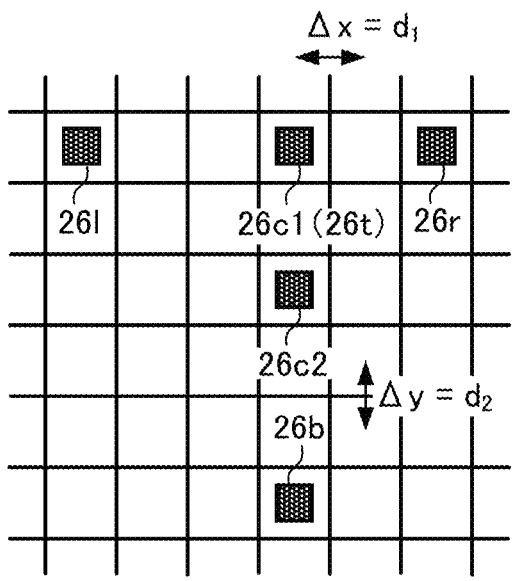
FIG.20B
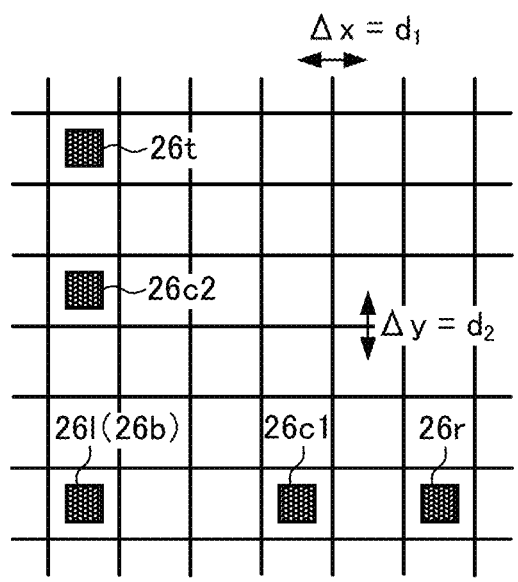
FIG.20C
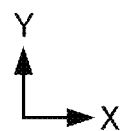

CALIBRATION SYSTEMS AND CALIBRATION METHOD

CROSS-REFERENCE TO RELATED APPLICATIONS

This application claims Convention priority to Japanese Patent Application No. 2018-087274, filed Apr. 27, 2018, the entire contents of which are incorporated herein by reference.

FIELD OF THE INVENTION

The present invention relates to a calibration system and a calibration method, and in particular to a calibration system and a calibration method for executing calibration of a phased array antenna based on a measurement result by a near field measurement method.

BACKGROUND ART

A phased array antenna such as a Massive-MIMO antenna expected to be used for 5G has a plurality of antenna elements, and is capable of controlling radiation direction and beam shape of the electromagnetic wave to be outputted by controlling the amplitude and phase of each antenna element.

In order to radiate electromagnetic waves of a desired radiation direction and beam shape from the phased array antenna as described above, it is desirable that the transmission properties of the plurality of antenna elements are equal to each other. However, in general, the transmission properties differ from one element to another due to individual differences of the antenna elements and the like. Therefore, it is important to calibrate the antenna elements so that the amplitude and phase take a predetermined value (for example, equal phase and equal amplitude) for each antenna element, before the use of the phased array antenna.

Conventionally, as a calibration method, an element electric field vector rotation method (REV method) for determining an amplitude and a phase is known (for example, see Non-Patent Document 1), in which the amplitude and the phase of each antenna element are determined based on the measurement result of the amplitude of the electric field generated from the array antenna in the far field, while rotating the phase of each antenna element of the array antenna.

Here, the far field is defined as a position spaced apart from the antenna by a distance R, that satisfies the following formula (1), or longer, with respect to the maximum diameter D (aperture size) of the antenna, where λ is the free space wavelength.

$$R > 2D^2/\lambda \quad (1)$$

In general, as shown in FIG. 23, of the electromagnetic field radiated from the antenna aperture plane, the area close to the antenna aperture is called a reactive near field area (extreme near field) mainly constituted of electromagnetic field components that do not contribute to radiation, and the area where the directivity does not change according to the distance from the antenna aperture is called a radiating far field area (far field). In general, the directivity of the antenna refers to the directivity measured in the radiating far field area.

The radiating near field area (near field), which is the area between the reactive near field area and the radiation far field area, is an area whose directivity changes according to the distance. As a method of measuring the properties of an antenna with strong directivity like the Massive-MIMO antenna, a near field measurement method is known in which electromagnetic fields are measured in the radiation near field area and the directivity in the far field is obtained through a calculation.

Now, the REV method is an effective method that can determine the relative phase of each antenna element only by measuring the amplitude, but since it is necessary to perform measurement for each antenna element, there is a problem that calibration time increases as the number of antenna elements increases. In particular, in a massive-MIMO antenna using a multi-element array antenna, there is a possibility that the measurement time increases enormously.

As a means to solve the problem of the REV method mentioned above, a method is proposed in which the aperture plane distribution of the antenna at the distance R=0 is estimated by back projecting the near field measurement result, so that the relative phase of each antenna element of the array antenna is measured at once (See, for example, Patent Document 1).

CITATION LIST

Non-Patent Literature

Non-Patent Document 1: Mano Seiji, Katagi Takashi, "A Method for Measuring Amplitude and Phase of Each Radiating Element of a Phased Array Antenna", Transactions of the Institute of Telecommunications, Vol. J65-B, No. 5, pp. 555-560, May 1982

Patent Literature

Patent Document 1: Japanese Patent No. 3491038

SUMMARY OF THE INVENTION

Technical Problem

However, according to the method disclosed in Patent Document 1, there is a problem that it is difficult to separately distinguish the electric field radiated from each antenna element when the interval between the respective antenna elements of the array antenna is not sufficiently large, thereby making it impossible to uniquely determine the phase of the antenna element.

The present invention has been made to solve such a conventional problem, and it is an object of the present invention to provide a calibration system and a calibration method capable of measuring the amplitude and the phase of the radio signal on the electromagnetic radiation surface of the measured antenna, even in the case where the interval between antenna elements is narrow with respect to the wavelength of the radio signal transmitted from a plurality of antenna elements of the measured antenna.

Means to Solve the Problem

In order to solve the above problem, a calibration system according to the present invention is a calibration system, comprising: a probe antenna that receives a radio signal at a plurality of measurement positions set on a predetermined measurement plane in a near field area of a measured antenna having a plurality of antenna elements; an amplitude phase measurement unit that measures amplitude and phase of the radio signal received by the probe antenna; and a back projection processing unit that calculates an amplitude distribution and a phase distribution of the radio signal on the electromagnetic radiation surface of the measured antenna based on the amplitude and the phase measured by the amplitude phase measurement unit, wherein the calibration system further comprises an antenna control unit that selects and excites one combination of antenna elements from among the plurality of antenna elements, and thereafter selects and excites another combination of antenna elements distinct from the one combination of the antenna elements, the probe antenna receives the radio signal transmitted from the respective combinations of the antenna elements, the back projection processing unit calculates the amplitude distribution and the phase distribution of the radio signals transmitted from the respective combinations of the antenna elements, and the calibration system further comprises: an amplitude phase extraction unit that extracts values of the amplitude and the phase corresponding to the positions of the respective combinations of the antenna elements on the electromagnetic radiation surface, from the amplitude distribution and the phase distribution calculated by the back projection processing unit; and a first phase calculation unit that calculates the phase corresponding to the respective positions of the plurality of the antenna elements on the electromagnetic radiation surface, from the values of the phase extracted by the amplitude phase extraction unit.

By this configuration, the calibration system according to the present invention is capable of measuring the amplitude and the phase of the radio signal on the electromagnetic radiation surface of the measured antenna, even in the case where the interval between antenna elements is narrow with respect to the wavelength of the radio signal transmitted from a plurality of antenna elements of the measured antenna.

The calibration system according to the present invention may be so configured that the probe antenna includes a plurality of probes: a first probe; a second probe and a third probe arranged to sandwich the first probe in a horizontal direction within the measurement plane; a fourth probe; a fifth probe and a sixth probe arranged to sandwich the fourth probe in a vertical direction within the measurement plane, the amplitude and phase measurement unit includes: an amplitude phase difference measurement unit that measures the phase difference between the radio signals received by the plurality of probes, and measures the amplitude of the radio signals received by the plurality of probes; an adjacent phase difference calculation unit that calculates a phase difference between the radio signals at two adjacent measurement positions, from the phase difference measured by the amplitude phase difference measurement unit; and a second phase calculation unit that calculates the phase of the radio signal at the respective measurement positions, from the phase difference calculated by the adjacent phase difference calculation unit, the distance between the center of the first probe and the center of the second probe in the measurement plane is longer than the distance between the center of the first probe and the center of the third probe in the measurement plane, by the interval d1 between two measurement positions adjacent to each other in the horizontal direction, and the distance between the center of the fourth probe and the center of the fifth probe in the measurement plane is longer than the distance between the center of the fourth probe and the center of the sixth probe in the measurement plane, by the interval d2 between two measurement positions adjacent to each other in the vertical direction.

By this configuration, the calibration system according to the present invention is capable of measuring the phase and the amplitude in the near field without supplying the synchronization signal from the measured antenna, with respect to the radio signal transmitted from the measured antenna integrated with the RF circuit. Therefore, the calibration system according to the present invention is capable of measuring the amplitude and the phase of the radio signal on the electromagnetic radiation surface of the measured antenna, even in the case where the interval between antenna elements is narrow with respect to the wavelength of the radio signal transmitted from a plurality of antenna elements of the measured antenna.

Further, the calibration system according to the present invention may be so configured that any one of the first probe, the second probe, and the third probe serves as any one of the fourth probe, the fifth probe, and the sixth probe.

Further, the calibration system according to the present invention may be so configured that the measured antenna includes an amplitude phase adjustment unit that adjusts the amplitude and phase of the radio signal transmitted from the respective antenna elements on the electromagnetic radiation surface of the measured antenna, the antenna control unit includes: an amplitude control unit that controls an amplitude adjustment amount by the amplitude phase adjustment unit, in accordance with a difference between the amplitude extracted by the amplitude phase extraction unit and a predetermined desired value of the amplitude; and a phase control unit that controls a phase adjustment amount by the amplitude phase adjustment unit, in accordance with a difference between the phase calculated by the first phase calculation unit and a predetermined desired value of the phase.

By this configuration, the calibration system according to the present invention is capable of executing the calibration to adjust so that the amplitude and the phase of the radio signal transmitted from the respective antenna elements take a predetermined value, even in the case where the interval between antenna elements is narrow with respect to the wavelength of the radio signal transmitted from a plurality of antenna elements of the measured antenna.

Further, the calibration system according to the present invention may be so configured that an interval between radiation sources of the combination of the antenna elements selected by the antenna control unit is set to be longer than half wave length of the radio signal transmitted from each of the antenna elements.

Further, the calibration system according to the present invention may be so configured that between the antenna elements in the one combination of the antenna elements selected by the antenna control unit, there exists either one of the antenna elements in the another combination of the antenna elements to be subsequently selected by the antenna control unit.

Furthermore, the calibration system according to the present invention may be so configured that when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

Still further, the calibration method according to the present invention comprises: an antenna control step to select and excite one combination of antenna elements from among a plurality of antenna elements of a measured antenna, and thereafter select and excite another combination of antenna elements distinct from the one combination of the antenna elements; a reception step to receive a radio signal transmitted from each of the combination of antenna elements by a probe antenna, at a plurality of measurement positions set on a predetermined measurement plane in a near field area of the measured antenna, each time the combination of antenna elements selected in the antenna control step is switched; an amplitude phase measurement step to measure amplitude and phase of the radio signal received by the reception step; a back projection processing step to calculate an amplitude distribution and a phase distribution of the radio signal transmitted from each of the combination of the antenna elements on an electromagnetic radiation surface of the measured antenna, based on the amplitude and the phase measured by the amplitude phase measurement step; an amplitude phase extraction step to extract amplitude and phase values corresponding to position of each of the combination of the antenna elements on the electromagnetic radiation surface, from the amplitude distribution and the phase distribution calculated by the back projection processing step; and a first phase calculation step to calculate phases corresponding to respective positions of the plurality of antenna elements on the electromagnetic radiation surface, from the phase values extracted by the amplitude phase extraction step.

By this configuration, the calibration method according to the present invention is capable of measuring the amplitude and the phase of the radio signal on the electromagnetic radiation surface of the measured antenna, even in the case where the interval between antenna elements is narrow with respect to the wavelength of the radio signal transmitted from a plurality of antenna elements of the measured antenna.

Effect of Invention

The present invention provides a calibration system and a calibration method capable of measuring the amplitude and the phase of the radio signal on the electromagnetic radiation surface of the measured antenna, even in the case where the interval between antenna elements is narrow with respect to the wavelength of the radio signal transmitted from a plurality of antenna elements of the measured antenna.

BRIEF DESCRIPTION OF THE DRAWINGS

FIGS. 5A-5E are diagrams showing an arrangement example of a plurality of antenna elements provided in the measured antenna.

FIGS. 7A and 7B are diagrams showing a result of performing back projection processing in a state in which the amplitude of all the antenna elements is uniform and the phase is random.

FIGS. 8A and 8B are diagrams showing a result of performing a back projection process on a combination 1 of antenna elements.

FIGS. 9A and 9B are diagrams showing a result of performing a back projection process on a combination 2 of antenna elements.

FIGS. 10A and 10B are diagrams showing a result of performing a back projection process on a combination 3 of antenna elements.

FIGS. 11A and 11B are diagrams showing a result of performing a back projection process on a combination 4 of antenna elements.

FIGS. 12A and 12B are diagrams showing a result of performing a back projection process on a combination 5 of antenna elements.

FIGS. 13A and 13B are diagrams showing a result of back projection processing performed with calibration performed on all antenna elements.

FIGS. 20A-20C are diagrams showing another arrangement example of a plurality of probes provided in the calibration system according to the second embodiment of the present invention.

DETAILED DESCRIPTION OF THE INVENTION

Hereinafter, embodiments of a calibration system and a calibration method according to the present invention will be described with reference to the drawings. The calibration system according to the present invention measures the amplitude and the phase of a radio signal transmitted from a measured antenna including a plurality of antenna elements in the near field, and makes adjustment (performs calibration) so that the amplitude and the phase of the radio signal transmitted from each antenna element are set to predetermined values.

First Embodiment

Figure 1:
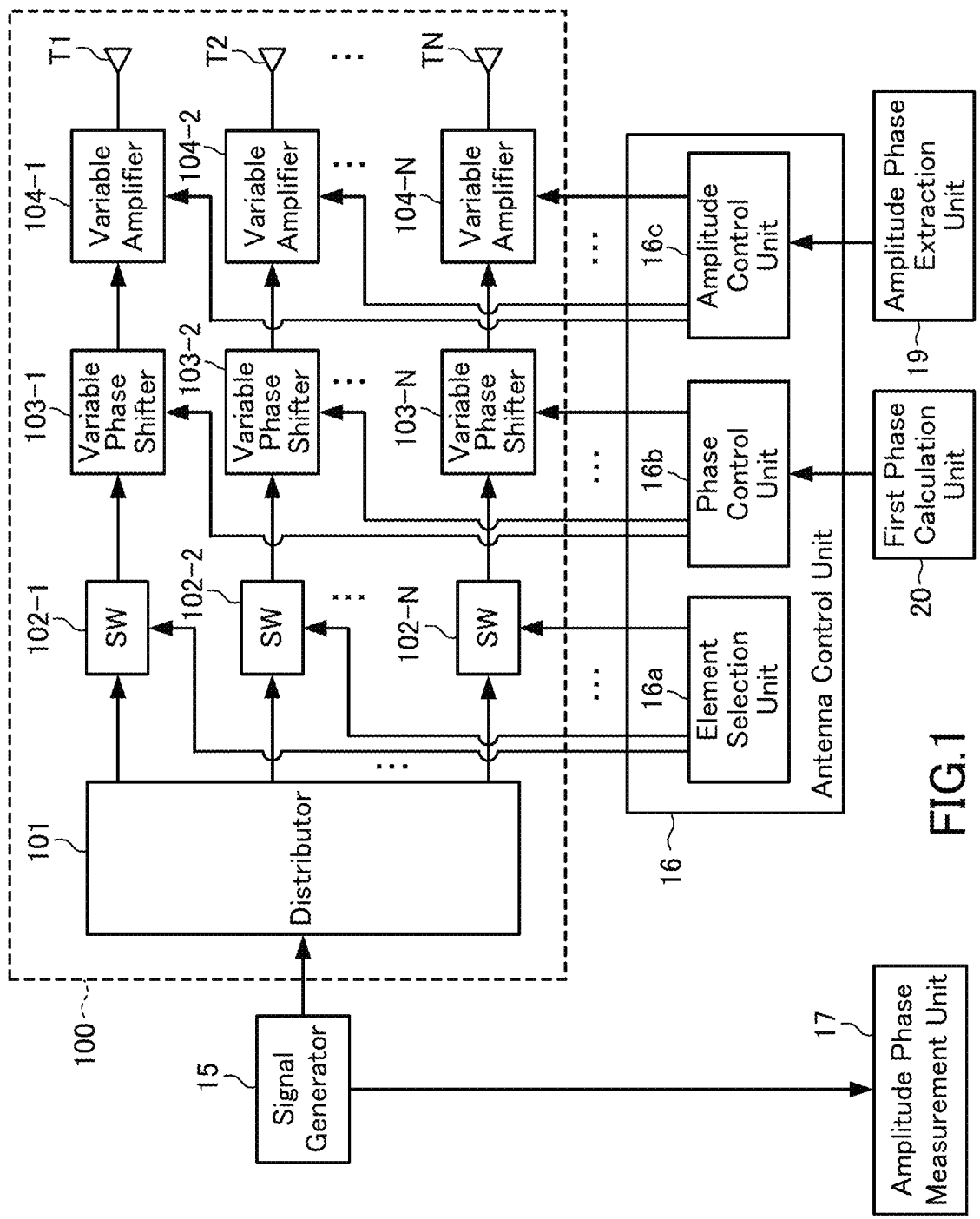
FIG. 1 is a block diagram showing a configuration of a measured antenna to be calibrated by a calibration system according to a first embodiment of the present invention.

As shown in FIG. 1, the measured antenna 100 is, for example, an array antenna such as a massive-MIMO antenna and includes a distributor 101, SWs 102-1 to 102-N, variable phase shifters 103-1 to 103-N, variable amplifiers 104-1 to 104-N, and antenna elements T1 to TN. The variable phase shifters 103-1 to 103-N and the variable amplifiers 104-1 to 104-N constitute an amplitude phase adjustment unit that adjusts the amplitude and the phase of the radio signal transmitted from each of the antenna elements T1 to TN on the electromagnetic radiation surface of the measured antenna 100.

The distributor 101 distributes the radio signal outputted from the signal generator 15 to be described later to the plurality of variable phase shifters 103-1 to 103-N via the plurality of SWs 102-1 to 102-N.

The SWs 102-1 to 102-N, which are for individually switching the plurality of antenna elements T1 to TN between an excited state and a non-excited state, switch whether or not to input the radio signal distributed from the distributor 101 to the phase shifters 103-1 to 103-N provided in a subsequent stage, in accordance with a control signal from an element selection unit 16a to be described later.

The variable phase shifters 103-1 to 103-N adjust the phase of the radio signal distributed from the distributor 101, in accordance with a control signal from a phase control unit 16b to be described later.

The variable amplifiers 104-1 to 104-N, which are for adjusting the amplitude of the radio signal after the phase adjustment output from the variable phase shifters 103-1 to 103-N, adjust the amplitude of the radio signal in accordance with a control signal from an amplitude control unit 16c to be described later, and input the radio signal after the amplitude adjustment to the antenna elements T1 to TN.

Figure 2:
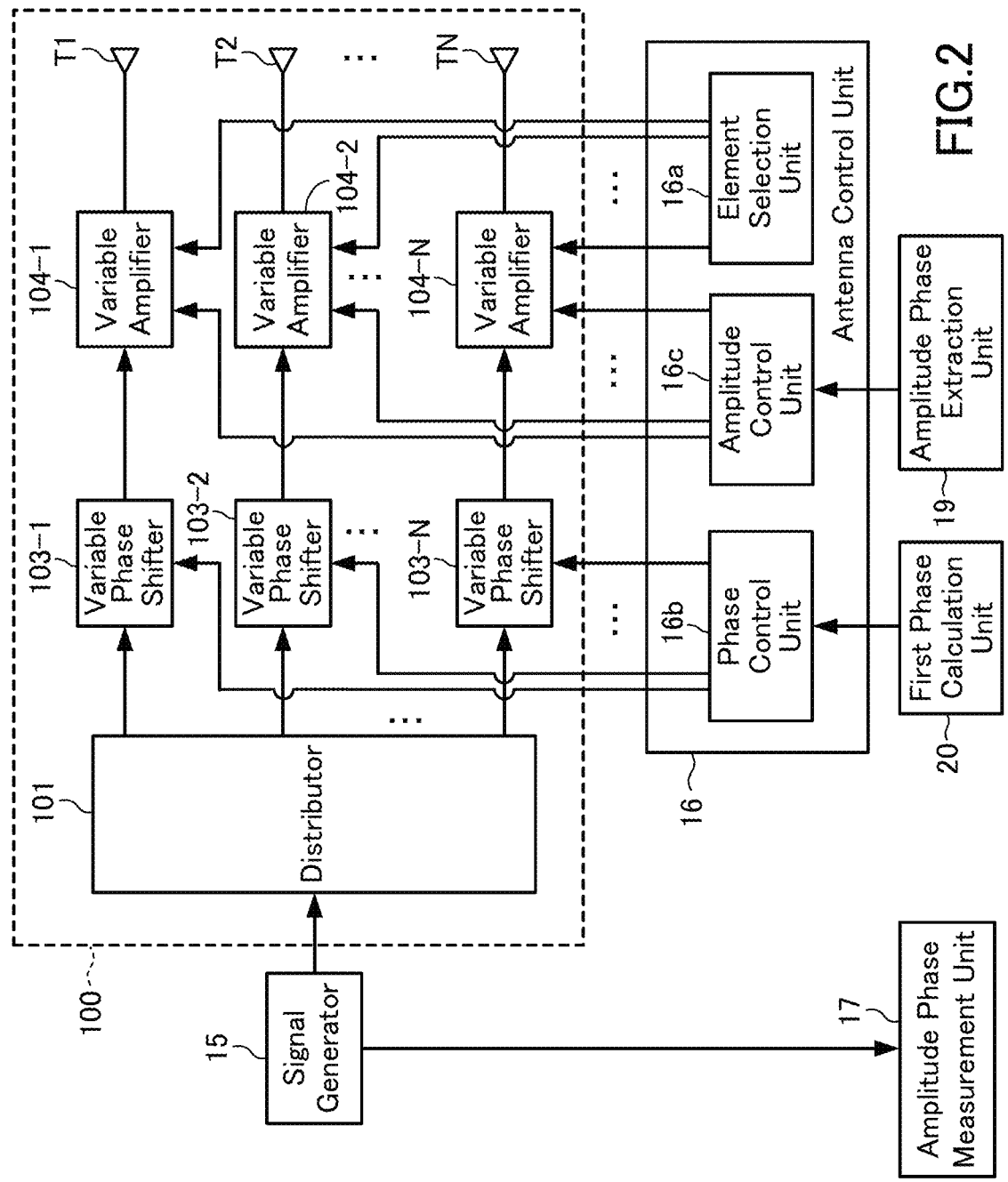
FIG. 2 is a block diagram showing another configuration of a measured antenna to be calibrated by the calibration system according to the first embodiment of the present invention.

As shown in FIG. 2, the measured antenna 100 may not include the SWs 102-1 to 102-N. In this case, the variable amplifiers 104-1 to 104-N are powered on or off in accordance with a control signal from the element selection unit 16a to be described later, so that the plurality of antenna elements T1 to TN are individually switched between the excited state and the non-excited state.

Figure 3:
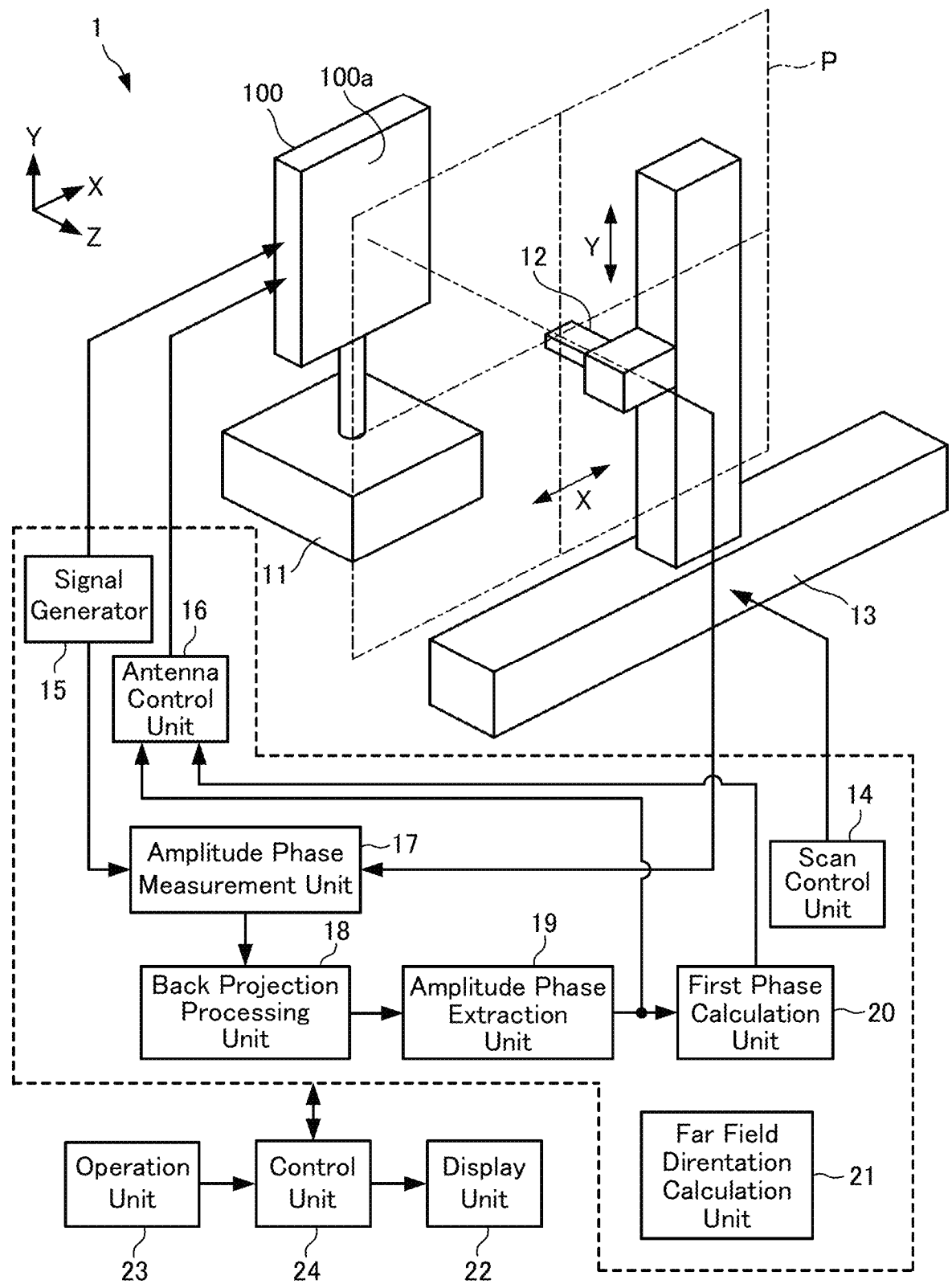
FIG. 3 is a configuration diagram of a calibration system according to the first embodiment of the present invention.

As shown in FIG. 3, the calibration system 1 of the present embodiment includes an antenna support unit 11, a probe antenna 12, a probe scan mechanism 13, a scan control unit 14, a signal generator 15, an antenna control unit 16, an amplitude phase measurement unit 17, a back projection processing unit 18, an amplitude phase extraction unit 19, a first phase calculation unit 20, a far field directivity calculation unit 21, a display unit 22, an operation unit 23, and a control unit 24.

As shown in FIG. 1 and FIG. 2, the antenna control unit 16 includes an element selection unit 16a, a phase control unit 16b, and an amplitude control unit 16c.

The element selection unit 16a transmits to the measured antenna 100 a control signal for sequentially switching and selecting a part of the plurality of antenna elements that are spaced apart from each other by a predetermined interval or longer from among the plurality of antenna elements T1 to TN included in the measured antenna 100. The part of the antenna elements are excited by being selected by the element selection unit 16a. In the case that the measured antenna 100 has SWs 102-1 to 102-N, the element selection unit 16a outputs the control signals to SWs 102-1 to 102-N. On the other hand, in the case that the measured antenna 100 does not have the SWs 102-1 to 102-N, the element selection unit 16a outputs the control signals to the variable amplifiers 104-1 to 104-N for powering on or off the same.

The phase control unit 16b outputs a control signal for adjusting the phase of the radio signal distributed from the distributor 101 to the variable phase shifters 103-1 to 103-N.

Further, the amplitude controller 16c outputs a control signal for adjusting the amplitude of the phase-adjusted radio signal outputted from the variable phase shifters 103-1 to 103-N to the variable amplifiers 104-1 to 104-N.

The signal generator 15 generates a radio signal such as an unmodulated wave signal or a wideband signal (for example, an OFDM signal), and outputs the generated radio signal to the measured antenna 100 so as to transmit the radio signal from the measured antenna 100. In addition, the signal generator 15 outputs a synchronization signal synchronized with the output of the radio signal to the measured antenna 100 to the amplitude phase measurement unit 17.

As shown in FIG. 3, the antenna support unit 11 supports the measured antenna 100 in a state in which its electromagnetic radiation surface 100a faces in a predetermined direction.

Each time a part of the antenna elements selected by the antenna control unit 16 are switched, the probe antenna 12 receives an electromagnetic wave of the radio signal transmitted from the part of the antenna elements at a plurality of measurement positions set within a predetermined measurement plane P of the near field area of the measured antenna 100. The measurement plane P is provided parallel to the electromagnetic radiation surface 100a of the measured antenna 100 at a distance of about three wavelengths of the radio signal transmitted from the measured antenna 100. Further, the plurality of measurement positions are set in the horizontal direction and the vertical direction within the measurement plane P at intervals equal to or shorter than ½ wavelength (0.5λ) of the radio signal transmitted from the measured antenna 100.

For example, the probe antenna 12 has a waveguide that propagates electromagnetic waves in a predetermined frequency range of microwave or millimeter wave band, and forms a waveguide having an open tip. A rectangular waveguide having a rectangular cross section or a double ridge waveguide having a cross sectional shape having a smaller height at the central portion with respect to the height of both side portions can be use as such a wave guide.

Figure 4A:
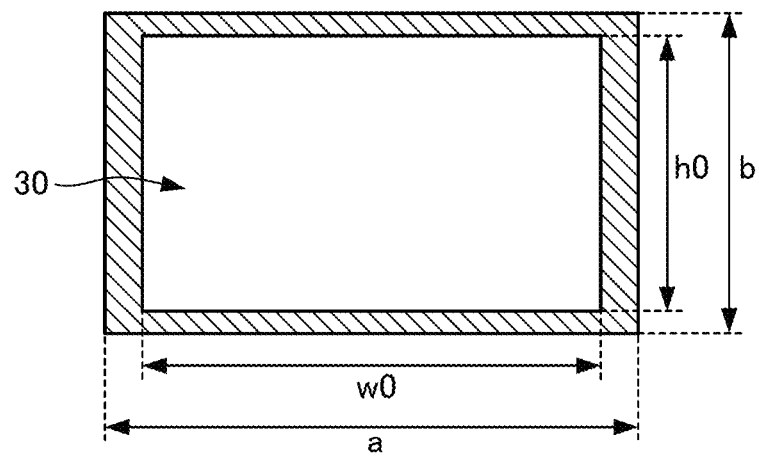
FIG. 4A is a cross sectional view of a rectangular waveguide used as a probe antenna.

FIG. 4A is a view showing a cross section perpendicular to the longitudinal direction of the waveguide 30 of the rectangular waveguide used as the probe antenna 12. The outer shape a×b of the rectangular waveguide can be arbitrarily defined as long as it is larger than the inner diameter w0×h0 and the strength as a structure can be secured.

Figure 4B:
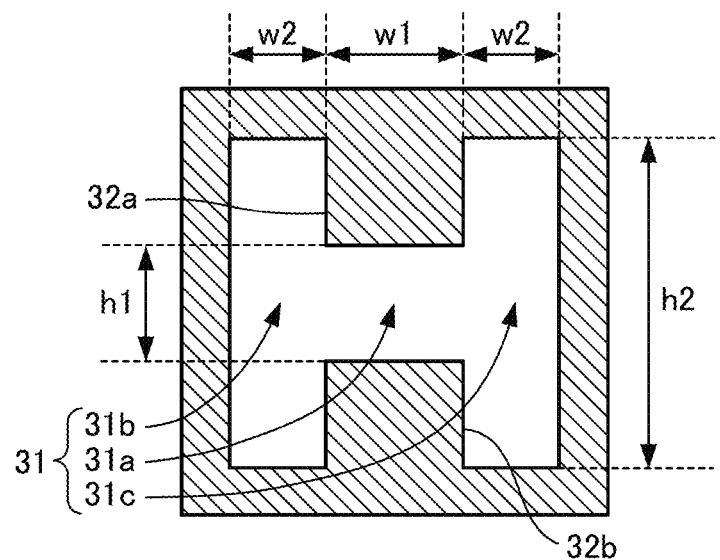
FIG. 4B is a cross sectional view of a double ridge waveguide used as a probe antenna.

FIG. 4B is a view showing a cross section perpendicular to the longitudinal direction of the waveguide 31 of the double ridge waveguide used as the probe antenna 12. In the double ridge waveguide, two projecting portions 32a, 32b projecting in directions approaching each other from the center of the upper and lower inner walls are continuously formed in the longitudinal direction. In other words, the height h1 of the central portion 31a of the waveguide 31 is set smaller than the height h2 of the side portions 31b, 31c.

This double ridge waveguide has an advantage that, by adjusting the width w1 and the height h1 of the central portion 31a and the width w2 and the height h2 of the side portions 31b, 31c, it is possible to propagate the electromagnetic wave in the same frequency range, with a sectional shape smaller than the sectional shape of the aforementioned rectangular waveguide. Further, when the double ridge waveguide has the same width and height, there is an advantage that the aperture becomes wider, thereby increasing the receiving sensitivity.

The probe scanning mechanism 13 moves the probe antenna 12 in the X and Y directions within the measurement plane P in the vicinity that faces the electromagnetic radiation surface 100a of the measured antenna 100. In other words, the probe scanning mechanism 13 is configured to move the probe antenna 12 to a plurality of measurement positions within the measurement plane P.

The scan control unit 14 controls the probe scan mechanism 13 to move the probe antenna 12 in a predetermined order to all measurement positions (lattice points) in the measurement plane P. Further, the scan control unit 14 is adapted to send the position information of the measurement position where the probe antenna 12 exists to the back projection processing unit 18 and the far field directivity calculation unit 21.

The amplitude phase measurement unit 17 measures the amplitude and the phase of the radio signal received by the probe antenna 12 with reference to the timing of the synchronization signal outputted from the signal generator 15. For example, the amplitude phase measurement unit 17 can be constituted by a vector network analyzer (VNA), a spectrum analyzer, an oscilloscope or the like.

Based on the amplitude and phase values measured by the amplitude phase measurement unit 17 and the position information sent from the scan control unit 14, the back projection processing unit 18 performs back projection processing based on the back projection method disclosed in Patent Document 1, and calculates the amplitude distribution and the phase distribution on the electromagnetic radiation surface 100a of the radio signal transmitted from the part of the antenna elements selected by the element selection unit 16a of the antenna control unit 16.

The amplitude phase extraction unit 19 extracts the amplitude and phase values corresponding to the positions of the respective antenna elements on the electromagnetic radiation surface 100a from the amplitude distribution and the phase distribution calculated by the back projection processing unit 18. For example, the amplitude phase extraction unit 19 extracts the amplitude and phase values corresponding to one point of each of the part of the antenna elements. Alternatively, the amplitude phase extraction unit 19 may convert the average value of the amplitude and the phase value corresponding to the predetermined area surrounding one point of each of the part of the antenna elements into the amplitude and phase values corresponding to the positions of the respective antenna elements.

The first phase calculation unit 20 calculates the phases corresponding to the respective positions of the plurality of antenna elements T1 to TN on the electromagnetic radiation surface 100a from the phase values extracted by the amplitude phase extraction unit 19.

The phase control unit 16b of the antenna control unit 16 controls the amount of phase adjustment by the variable phase shifters 103-1 to 103-N, in accordance with the difference between the value of the phase calculated for each of the antenna elements T1 to TN and the predetermined desired value of the phase set for each of the antenna elements T1 to TN by the first phase calculation unit 20. Here, the predetermined desired value of the phase is, for example, such a value that the phases corresponding to the respective positions of all the antenna elements T1 to TN are equiphase.

The amplitude control unit 16c of the antenna control unit 16 controls the amount of amplitude adjustment by the variable amplifiers 104-1 to 104-N, in accordance with the difference between the value of the amplitude extracted for each of the antenna elements T1 to TN and the predetermined desired value of the amplitude set for each of the antenna elements T1 to TN by the amplitude phase extraction unit 19. Here, the predetermined value of the amplitude is, for example, such a value that the amplitudes corresponding to the respective positions of all the antenna elements T1 to TN are equal amplitudes.

The far-field directivity calculation unit 21 calculates the far-field directivity by using the position information of the probe antenna 12 outputted from the scan control unit 14 and the amplitude and phase values measured by the amplitude phase measurement unit 17. Here, it is possible to obtain the directivity of the measured antenna 100 in the far field, by conducting numerical calculation of the known near field/far field conversion method to estimate the electric field strength distribution in the far field.

The display unit 22 is constituted by a display device such as an LCD or a CRT, for example, and displays various display contents according to a control signal from the control unit 24. The display contents include measurement results of amplitude and phase on the electromagnetic radiation surface 100a of the measured antenna 100, calculation results of directivity in the far field of the measured antenna 100, and the like. Further, the display unit 22 is adapted to display operation objects such as buttons for setting measurement conditions and the like, buttons, soft keys, pull-down menus, text boxes, and the like.

The operation unit 23, which is provided for performing an operation inputted by the user, is configured by, for example, a touch panel provided on the surface of the display screen of the display unit 22. Alternatively, the operation unit 23 may include an input device such as a keyboard or a mouse. For example, the user can input desired values of amplitude and phase of each antenna element using the operation unit 23.

The control unit 24 is constituted by a microcomputer, a personal computer, or the like including a CPU, a ROM, a RAM, an HDD, or the like, and controls the operation of the above-described components constituting the calibration system 1.

The amplitude phase measurement unit 17, the back projection processing unit 18, the amplitude phase extraction unit 19, the first phase calculation unit 20, and the far field directivity calculation unit 21 may be configured by a digital circuit such as a FPGA (Field Programmable Gate Array), an ASIC (Application Specific Integrated Circuit), or can be implemented in software by execution of a predetermined program by the control unit 24. Alternatively, the amplitude phase measurement unit 17, the back projection processing unit 18, the amplitude phase extraction unit 19, the first phase calculation unit 20, and the far field directivity calculation unit 21 may be realized by an appropriate combination of hardware processing by the digital circuit and software processing by the predetermined program.

The plurality of antenna elements T1 to TN in the measured antenna 100 are arranged at, for example, lattice points of a square lattice as shown in FIG. 5A, lattice points of a rectangular lattice as shown in FIG. 5B, lattice points of a hexagonal lattice as shown in FIG. 5C, lattice points of a diagonal lattice as shown in FIG. 5D, or lattice points of a parallel lattice as shown in FIG. 5E.

In order to separately obtain the amplitude and the phase of the radio signal transmitted from the plurality of antenna elements T1 to TN, the interval between the radiation sources of the part of the antenna elements selected by the element selection unit 16a is desirably set to be longer than half wave length (0.5λ) of the radio signal transmitted from each of the antenna elements.

Figure 6:
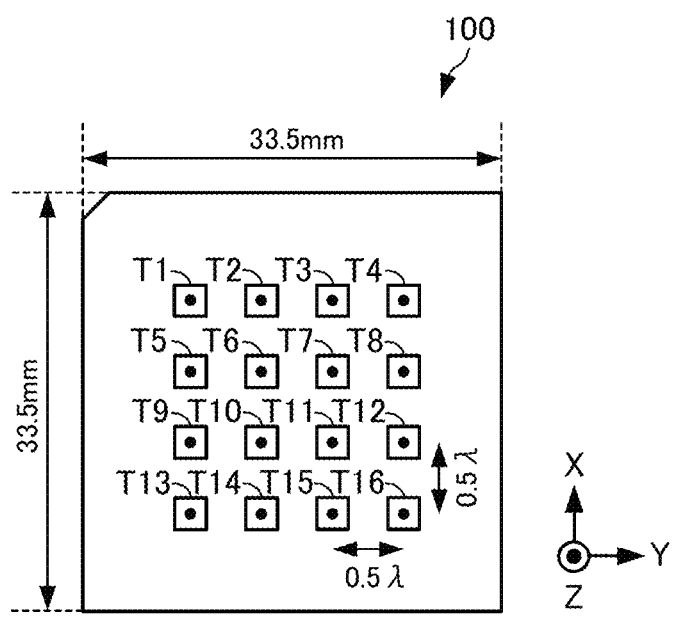
FIG. 6 is a diagram for explaining a combination of a part of antenna elements selected from among a plurality of antenna elements.

As shown in FIG. 6, the measured antenna 100 is, for example, an array antenna in which sixteen antenna elements T1 to T16 are arranged in a square lattice pattern at intervals of 0.5λ. In this case, the combination of the antenna elements selected by the element selection unit 16a is, for example, a combination of antenna elements T1, T3, T9, T11 (combination 1), antenna elements T2, T4, T10, T12 (combination 2) antenna elements T5, T7, T13, T15 (combination 3), antenna elements T6, T8, T14, T16 (combination 4) and the like. Thus, all the antenna elements can be covered by the four combinations in which the antenna elements are alternately selected.

This means that, between a part of the antenna elements (for example, combination 1) selected by the element selection unit 16a, there exists either one of the part of antenna elements (for example, combinations 2 to 4) which are switched and selected subsequently. Thus, the amplitude and the phase of the antenna elements are obtained for each of the combinations 1 to 4 in the amplitude phase extraction unit 19.

Further, the element selection unit 16a selects one antenna element from each of the combinations 1 to 4, such as the antenna elements T1, T4, T13, and T16 (combination 5), for example. The first phase calculation unit 20 calculates a phase shift amount between combinations 1 to 4 from the phases obtained in the combination 5 by the amplitude phase extraction unit 19 and corrects the phases of the combinations 1 to 4 with the shift amount. Thus, the phases for all the antenna elements T1 to T16 are obtained.

This holds true even in the case that the number of antenna elements included in the measured antenna 100 is greater than 16, and it is possible to determine the amplitude and phase with respect to all the antenna elements T1 to TN by the five measurements as described above.

In the array antenna shown in the example of FIG. 6, each antenna element is arranged at an interval of 0.5λ. However, if the space between the antenna elements is, for example, about 0.8λ, the combination of the antenna elements selection can be a combination of checkerboard lattice, such as antenna elements T1, T3, T6, T8, T9, T11, T14, T16 (combination A), and antenna elements T2, T4, T5, T7, T10, T12, T13, T15 (combination B).

This means that, when the plurality of antenna elements T1 to T16 are arranged in a square lattice shape or a rectangular lattice shape, the element selection unit 16a of the antenna control portion 16 may select a part of the antenna elements arranged in the positions of lattice points forming a checkerboard lattice shape, from among a plurality of the lattice points of the square lattice or the rectangular lattice. Here, the checkerboard lattice shape refers to an arrangement pattern of the selected antenna elements forming a shape of a checkerboard lattice or a checkered pattern. In other words, this arrangement pattern refers to: a combination of the odd-numbered antenna elements in the odd-numbered lines and the even-numbered antenna elements in the even-numbered lines; or the combination of the even-numbered antenna elements in the odd-numbered lines and the odd-numbered antenna elements in the even-numbered lines. For example, in the case of the square lattice, this arrangement pattern is such a combination that all the antenna elements selected by the element selection unit 16a are in a positional relationship that one antenna element is adjacent to the antenna element that is adjacent to the other antenna element. Here, "adjacent" is defined as a position of the nearest lattice point closest to the lattice point where the antenna element of interest is arranged. For example, in FIG. 6, consider the other antenna elements in a case where the T6 is the one antenna element. In this case, T5 and T7 are adjacent to T6 in Y direction, T1 and T9 are adjacent to T5 in X direction, T8 is adjacent to T7 in one direction in Y direction, and, T3 and T11 are adjacent to T7 in X direction. In addition, T10 is adjacent to T6 in one direction in X direction, and T14 is adjacent to T10 in one direction in X direction. Therefore, T1, T3, T8, T9, T11 and T14 are adjacent to an element that is adjacent to T6, and a combination of elements according to this rule are selected.

Further, the element selection unit 16a selects one antenna element from each of the combinations A and B, which may, for example, be the antenna elements T1 and T15 (combination C). The first phase calculation unit 20 calculates the phase shift amount between the combinations A and B from the phase obtained in the combination C by the amplitude phase extraction unit 19, and corrects the phases of the combinations A and B with the shift amount. Thus, the phases of all the antenna elements T1 to T16 are obtained in three measurements.

Hereinafter, the amplitude distribution and the phase distribution data on the electromagnetic radiation surface 100a obtained by the back projection processing unit 18 of the array antenna shown in FIG. 6 are shown in FIGS. 7 to 13.

FIGS. 7A and 7B show, as initial values, the result of the back projection process under the condition that all the antenna elements T1 to T16 are excited, wherein the amplitudes on the electromagnetic radiation surface 100a of each of the antenna elements T1 to T16 are uniform and the phases are random. The frames of the black solid lines in the figures show outer shapes of an antenna substrate and each of the antenna elements T1 to T16. Since the radiation waves from the respective antenna elements T1 to T16 are synthesized, it can be seen from the example of FIGS. 7A and 7B that it is difficult to obtain the amplitude and phase data separately for each of the antenna elements T1 to T16.

FIGS. 8A to 12B show the results of back projection processing for each of the combinations 1 to 5 described above. From the results in FIGS. 8A and 8B, it can be confirmed that the amplitude and phase data can be separated for each antenna element in the regions corresponding to the antenna elements T1, T3, T9, and T11. From the results of FIGS. 9A and 9B, it can be confirmed that the amplitude and phase data can be separated for each antenna element in the regions corresponding to the antenna elements T2, T4, T10, and T12. Further, from the results of FIGS. 10A and 10B, it can be confirmed that the amplitude and phase data can be separated for each antenna element in the region corresponding to the antenna elements T5, T7, T13, T15.

From the results of FIGS. 11A and 11B, it can be confirmed that amplitude and phase data can be separated for each antenna element in the regions corresponding to the antenna elements T6, T8, T14, and T16. Further, from the results of FIGS. 12A and 12B, it can be confirmed that the amplitude and phase data can be separated for each antenna element in the regions corresponding to the antenna elements T1, T4, T13, T16.

Based on the amplitude and phase data shown in FIGS. 8 to 12, the phase control unit 16b and the amplitude control unit 16c of the antenna control unit 16 control the amplitude and phase on the electromagnetic radiation surface 100a of all the antenna elements T1 to T16. FIG. 13 shows the results controlled to be equiphase and equal amplitude. From FIG. 13, it can be confirmed that in the amplitude distribution and the phase distribution on the electromagnetic radiation surface 100a, the entire regions (aperture surfaces) corresponding to the antenna elements T1 to T16 are equiphase and equal amplitude.

Figure 14:
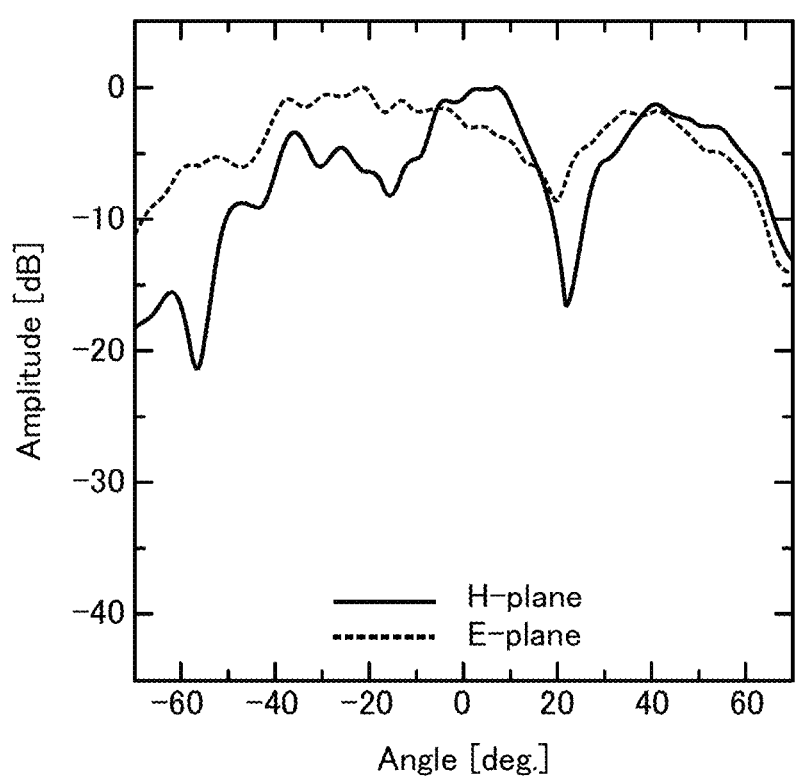
FIG. 14 is a graph showing the result of calculation of the directivity of the far field in a state where the amplitude of all the antenna elements is uniform and the phase is random.

FIG. 14 shows the result of the directivity of the far field calculated by the far field directivity calculation unit 21 with respect to the amplitude distribution and the phase distribution of FIGS. 7A and 7B, in which the amplitude on the electromagnetic radiation surface 100a of the antenna elements T1 to T16 is uniform and the phase is random. From the result of FIG. 14, it is understood that the radio wave of the radio signal is not radiated in the front direction of the array antenna and the directivity is disturbed, since the phase is random.

Figure 15:
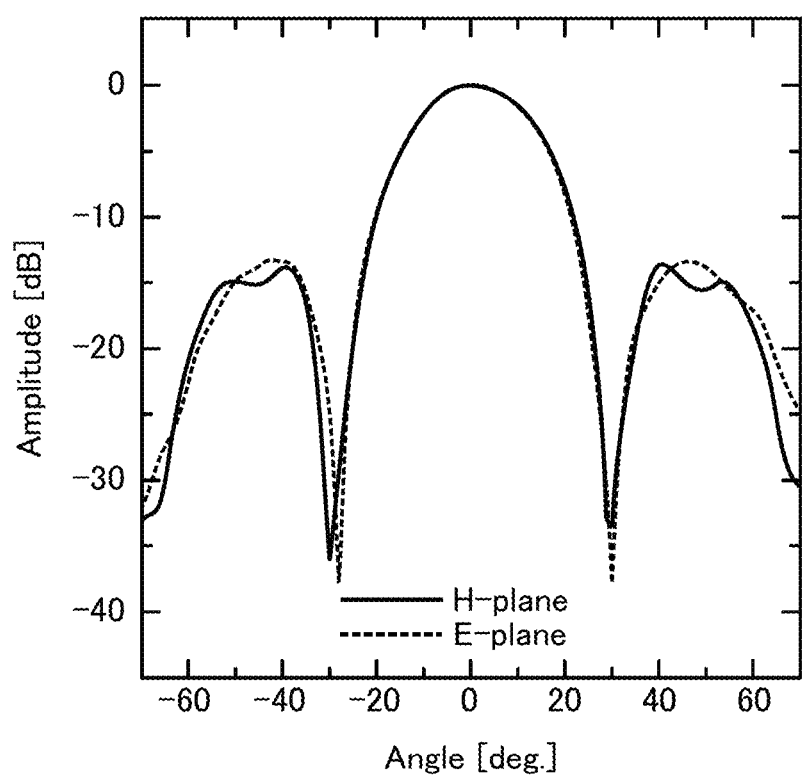
FIG. 15 is a graph showing the result of calculating directivity of a far field in a state where calibration is performed on all antenna elements.

On the other hand, FIG. 15 shows the result of the directivity of the far field calculated by the far field directivity calculation unit 21 with respect to the amplitude distribution and the phase distribution of FIGS. 13A and 13B, in which the amplitude and phase on the electromagnetic radiation surface 100a of all the antenna elements T1 to T16 are controlled to be equal amplitude and equal phase by the phase control unit 16b and the amplitude control unit 16c. From the result of FIG. 15, it is understood that the calibration can be performed normally, since the directivity in which the electric field plane (E plane) and the magnetic field plane (H plane) are uniform in the front direction of the array antenna can be confirmed.

Figure 16:
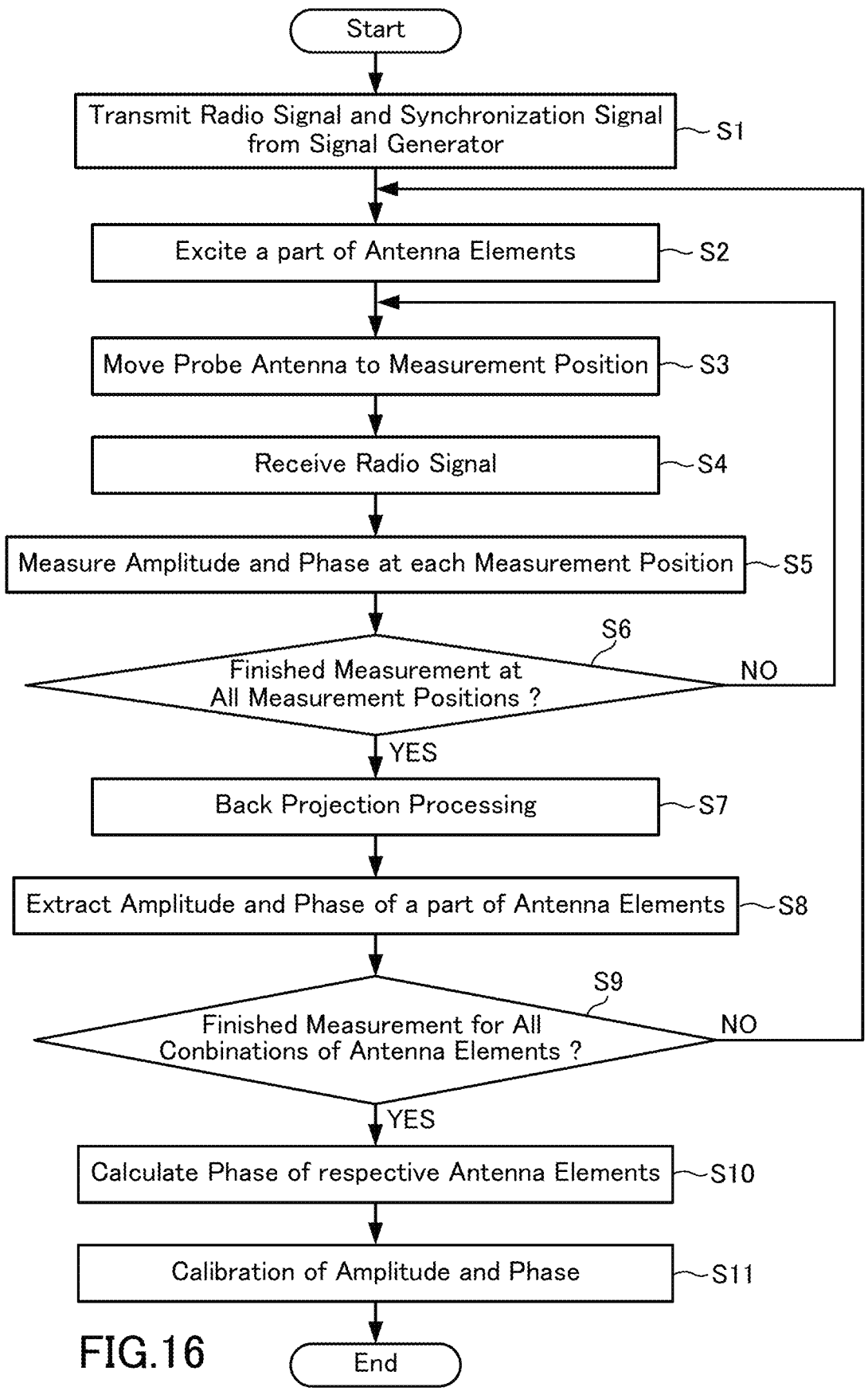
FIG. 16 is a flowchart showing a process of a calibration method using the calibration system according to the first embodiment of the present invention.

Hereinafter, the calibration method using the calibration system 1 according to the present embodiment will be described with reference to the flowchart of FIG. 16.

First, the signal generator 15 outputs a radio signal to the measured antenna 100 while outputting a synchronization signal synchronized with the output of the radio signal to the measured antenna 100 to the amplitude phase measurement unit 17 (step S1).

Next, the antenna control unit 16 excites a part of the antenna elements apart from each other by a predetermined interval or longer from among the plurality of antenna elements T1 to TN of the measured antenna 100 (antenna control step S2).

Next, the scan control unit 14 causes the probe scan mechanism 13 to move the probe antenna 12 to the measurement position in the measurement plane P (probe scan step S3).

Next, the probe antenna 12 receives the radio signal output from the part of the antenna elements excited in the antenna control step S2 at the measurement position moved in the probe scan step S3 in the near field area (reception step S4).

Next, the amplitude phase measurement unit 17 measures the amplitude and phase of the radio signal received in the reception step S4 (amplitude phase measurement step S5).

Next, the control unit 24 determines whether the amplitude and the phase values have been obtained for all measurement positions in the measurement plane P (step S6). In the case of a negative determination, the procedure returns to the probe scan step S3. In the case of a positive determination, the process proceeds to step S7.

In step S7, based on the amplitude and the phase measured in the amplitude phase measuring step S5, the back projection processing unit 18 calculates the amplitude distribution and the phase distribution of the radio signal transmitted from the part of the antenna elements on the electromagnetic radiation surface 100a of the measured antenna 100 (back projection process step S7).

Next, from the amplitude distribution and the phase distribution calculated in the back projection processing step S7, the amplitude phase extraction unit 19 extracts the amplitude and the phase values corresponding to positions of the part of the antenna elements on the electromagnetic radiation surface 100a (amplitude phase extraction step S8).

Next, the control unit 24 determines whether or not the amplitude distribution and the phase distribution have been obtained for all distinct combinations covering all the antenna elements T1 to TN as shown in FIGS. 8 to 12 (step S 9). In the case of a negative determination, the process returns to the antenna control step S2. In the case of a positive determination, the process proceeds to step S10.

In step S10, the first phase calculation unit 20 calculates the phase of each of the plurality of antenna elements T1 to TN on the electromagnetic radiation surface 100a from the phase values extracted by the amplitude phase extraction step S8 for all combinations of the antenna elements T1 to TN, and calculates the phase corresponding to the position (first phase calculation step S10).

Next, the phase control unit 16b controls the phase adjustment amount by the variable phase shifter 103-1 to 103-N, in accordance with the difference between the phase calculated for each of the antenna elements T1 to TN in the first phase calculation step S10 and the predetermined desired value of the phase for each of the antenna elements T1 to TN. Further, the amplitude control unit 16c controls the amount of amplitude adjustment by the variable amplifiers 104-1 to 104-N, according to the difference between the amplitude extracted for each of the antenna elements T1 to TN in the amplitude phase extraction step S8 and the predetermined desired value of the amplitude for each of the antenna elements T1 to TN (step S11).

As described above, the calibration system 1 according to the present embodiment can measure the amplitude and the phase of the radio signal on the electromagnetic radiation surface 100a of the measured antenna 100, by sequentially switching and exciting only a part of the antenna elements that are separated from each other by a predetermined interval or more from among the plurality of antenna elements T1 to TN, even in the case where the interval between the antenna elements T1 to TN is narrow with respect to the wavelength of the radio signal transmitted from the plurality of antenna elements T1 to TN of the measuring antenna 100.

Further, the calibration system 1 according to the present embodiment can execute a calibration to make an adjustment so that the amplitude and the phase of the radio signal outputted from the respective antenna elements take a predetermined value, even in the case where the interval between antenna elements T1 to TN is narrow with respect to the wavelength of the radio signal transmitted from a plurality of antenna elements T1 to TN of the measured antenna 100.

Second Embodiment

Subsequently, a calibration system 2 according to a second embodiment of the present invention will be described with reference to the drawings. Note that the same reference numerals are given to the same configurations as those of the first embodiment, and description thereof will be omitted as appropriate. In addition, description of operations similar to those in the first embodiment will also be omitted as appropriate.

Figure 17:
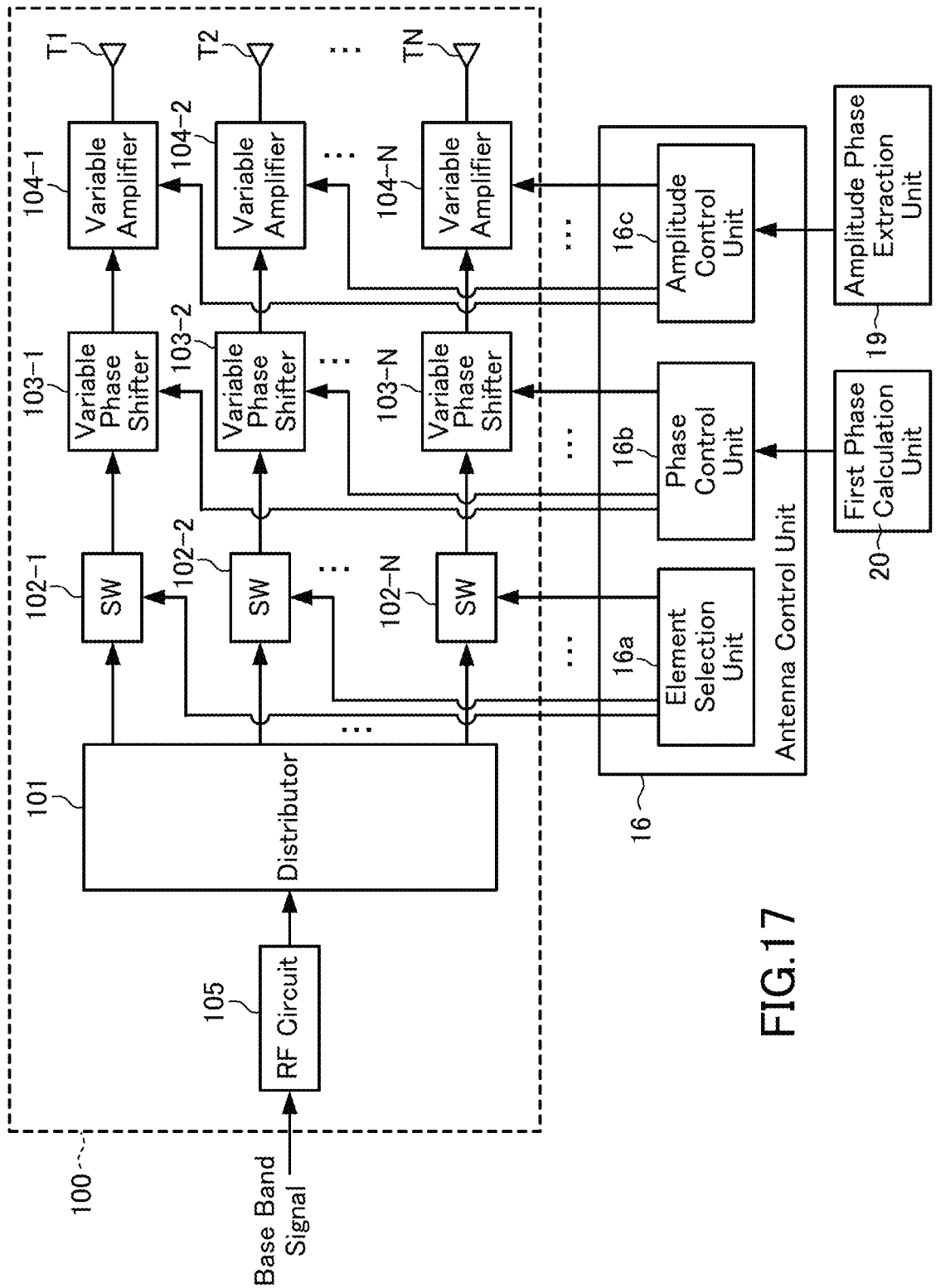
FIG. 17 is a block diagram showing a configuration of a measured antenna to be calibrated by the calibration system according to the second embodiment of the present invention.

As shown in FIG. 17, the measured antenna 100 in the present embodiment is, for example, an array antenna such as a massive-MIMO antenna formed by integrating an RF function (RF circuit) with a plurality of antenna elements T1 to TN, and an RF circuit 105 is provided in addition to the configuration of the first embodiment.

The RF circuit 105 converts a baseband signal of a multicarrier signal such as an input OFDM signal into a radio signal of a desired frequency band and outputs it to the distributor 101. The distributor 101 distributes the radio signal outputted from the RF circuit 105 to the plurality of variable phase shifters 103-1 to 103-N via the plurality of SWs 102-1 to 102-N. In the present embodiment, it is also possible to omit the SWs 102-1 to 102-N as shown in FIG. 2 of the first embodiment.

Figure 18:
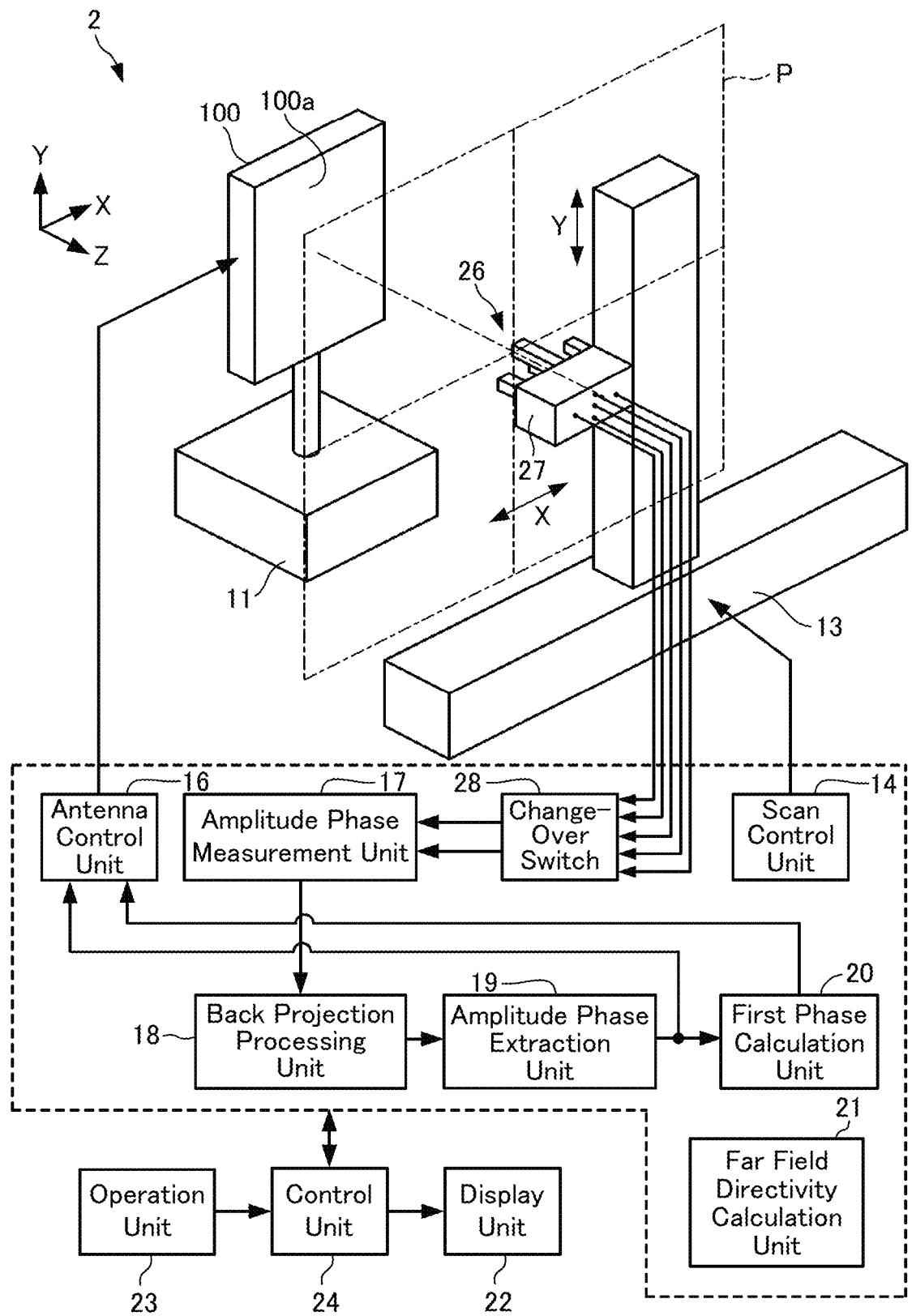
FIG. 18 is a configuration diagram of a calibration system according to a second embodiment of the present invention.

As shown in FIG. 18, the probe antenna 26 in the present embodiment is constituted by a plurality of probes including: a first probe; a second probe and a third probe arranged to sandwich the first probe in the horizontal direction (X direction) in the measurement plane P; a fourth probe; and a fifth probe and a sixth probe arranged to sandwich the fourth probe in the vertical direction (Y direction) in the measurement plane P, and an antenna support unit 27 that accommodates the plurality of probes.

Note that any one of the first probe, the second probe, and the third probe may also serve as one of the fourth probe, the fifth probe, and the sixth probe.

All of the plurality of probes may be the same or different from each other. When all the aperture shapes of the plurality of probes are set to be the same, the reception sensitivities of the respective probes are equal to each other, and there is an advantage that the averaging of the amplitudes becomes easy in the amplitude averaging unit 17$d$ to be described later.

For example, at least one of the plurality of probes may be a waveguide pipe with an open tip having a waveguide for propagating an electromagnetic wave in a predetermined frequency range in the microwave or millimeter wave band. A rectangular waveguide pipe having a waveguide with rectangular cross-section can be suitably used as such a waveguide pipe. Further, instead of a rectangular waveguide pipe, various waveguide pipes, such as a double ridge waveguide pipe whose cross-sectional shape of the waveguide has a small height at the central portion with respect to the height of both side portions, can be used as probes.

Figure 19:
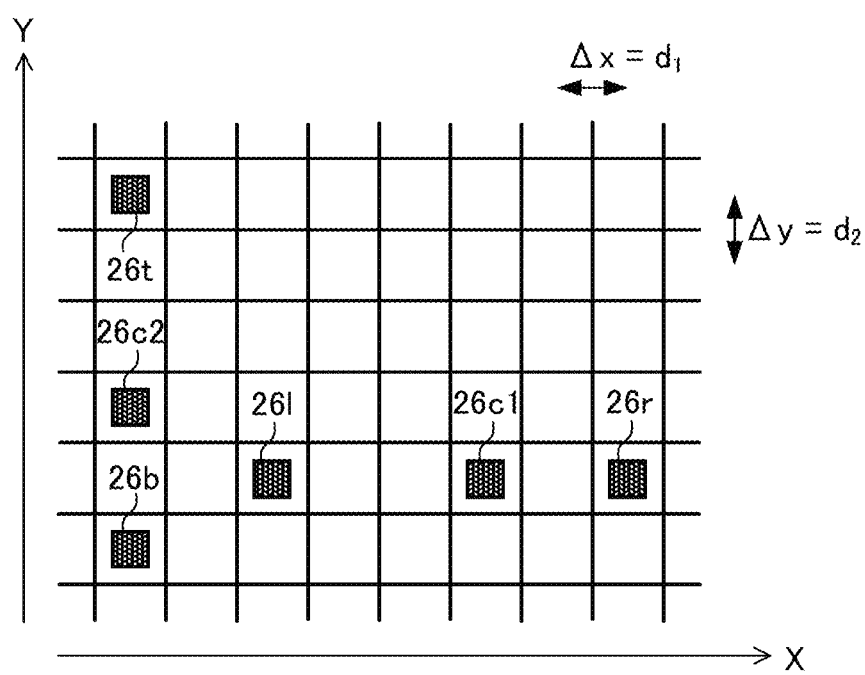
FIG. 19 is a schematic diagram showing arrangement and measuring positions of a plurality of probes provided in a calibration system according to a second embodiment of the present invention.

FIG. 19 is a schematic diagram showing an example of a measurement positions in the measurement plane P and measurement positions of a plurality of probes (indicated by black-filled right square marks in the drawing). As shown in FIG. 19, the measurement position can be expressed as a center position of a region obtained by dividing the measurement plane P into a lattice shape with Δx=d1 in X direction and Δy=d2 in Y direction. Here, it is assumed that the intervals d1 and d2 are equal to or less than ½ of the wavelength λ of the radio signal. It should be noted that d1 and d2 may be different from each other or may be equal.

In the example shown in FIG. 19, the probe antenna 26 is composed of central probes 26$c$1, 26$c$2, a left probe 26$l$, a right probe 26$r$, a top probe 26$t$, and a bottom probe 26$b$. Here, the central probe 26$c$1 corresponds to the first probe, the left probe 26$l$ corresponds to the second probe, and the right probe 26$r$ corresponds to the third probe. The central probe 26$c$2 corresponds to the fourth probe, the top probe 26$t$ corresponds to the fifth probe, and the bottom probe 26$b$ corresponds to the sixth probe.

The distance between the center of the first probe and the center of the second probe within the measurement plane P is longer than the distance between the center of the first probe and the center of the third probe within the measurement plane P, by the interval d1 which is a distance between the two measurement positions adjacent to each other in the horizontal direction.

Further, the distance between the center of the fourth probe and the center of the fifth probe within the measurement plane P is longer than the distance between the center of the fourth probe and the center of the sixth probe within the measurement plane P, by the interval d2 which is a distance between the two measurement positions adjacent to each other in the vertical direction.

FIGS. 20A-20C show another arrangement example of a plurality of probes within the measurement plane P. FIG. 20A is an example of a cross-shaped arrangement, in which the first probe (central probe 26$c$1) serves also as the fourth probe (central probe 26$c$2). FIG. 20B is an example of a T-shaped arrangement, in which the first probe (central probe 26$c$1) serves also as the sixth probe (top probe 26$t$). FIG. 20C is an example of the L-shaped arrangement, and the second probe (left probe 26$l$) serves as the fifth probe (bottom probe 26$b$).

The probe scan mechanism 13 is adapted to move a plurality of probes of the probe antenna 26 to measuring positions in the measuring plane P.

The scan control unit 14 controls the probe scan mechanism 13 to move each probe in a predetermined order to all the measurement positions in the measurement plane P. In addition, the scan control unit 14 is adapted to send the positional information of the measurement position where each probe exists to the back projection processing unit 18 and the far field directionality calculation unit 21.

In addition, the calibration system 2 according to the present embodiment is provided with a change-over switch 28 that selectively inputs radio signals received by two probes that are adjacent to each other in the horizontal direction or in the vertical direction among the plurality of probes to the amplitude phase measurement unit 17. Further, the change-over switch 28 can sequentially switch the combination of the two probes to be selected. When the number of input ports of a measurement device constituting the amplitude phase measurement unit 17 is equal to or more than the number of probes, the change-over switch 28 can be omitted.

Figure 21:
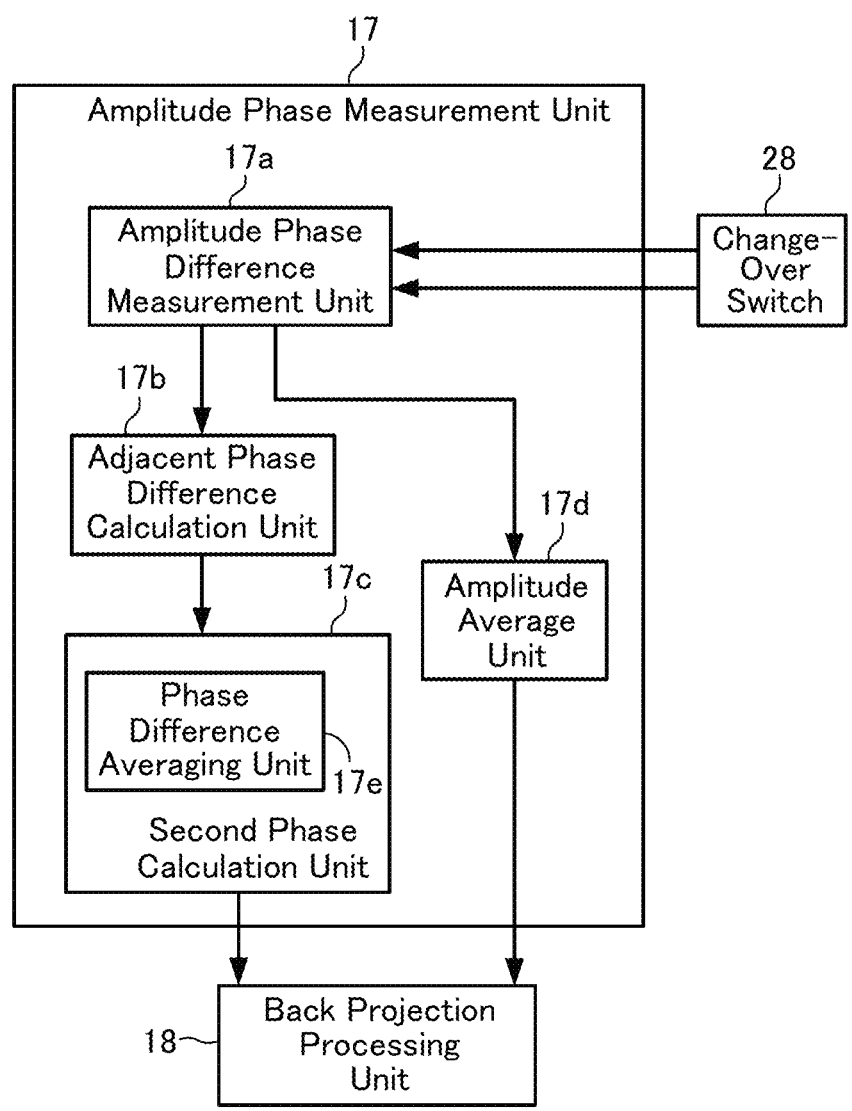
FIG. 21 is a block diagram showing a configuration of an amplitude phase measurement unit included in the calibration system according to the second embodiment of the present invention.

As shown in FIG. 21, in the present embodiment, the amplitude phase measurement unit 17 includes an amplitude phase difference measurement unit 17$a$, an adjacent phase difference calculation unit 17$b$, a second phase calculation unit 17$c$, and an amplitude averaging unit 17$d$.

The amplitude phase difference measurement unit 17$a$ is adapted to measure the phase difference between the radio signals (hereinafter, also referred to as "received signals") received by the plurality of probes, each time each of the probes is scanned at the measurement position by the probe scan mechanism 13.

This means that the received signals from the central probe 26$c$1 and the left probe 26$l$, the received signals from the central probe 26$c$1 and the right probe 26$r$, the received signals from the central probe 26$c$2 and the top probe 26$t$, and the received signals from the central probe 26$c$2 and the bottom probe 26$b$ are inputted to the amplitude phase difference measurement unit 17$a$. These received signals may be sequentially switched to be inputted to the amplitude phase difference measurement unit 17$a$ by using the change-over switch 28.

Further, the amplitude phase difference measurement unit 17a measures the amplitude of the radio signal received by the plurality of probes.

The adjacent phase difference calculation unit 17b calculates the phase difference between the radio signals at two adjacent measurement positions from the phase difference measured by the amplitude phase difference measurement unit 17a.

As described above, the distance between the central probe 26c1 and the left probe 26l is different from the distance between the central probe 26c1 and the right probe 26r by the interval d1 between the two measurement positions adjacent to each other in the horizontal direction, so that each probe is moved in the horizontal direction by the interval d1 while maintaining the relative positional relationship of each other, thereby making it possible to measure the phase difference in all of the two measurement positions adjacent to each other in the horizontal direction.

Similarly, since the distance between the central probe 26c2 and the top probe 26t is different from the distance between the central probe 26c2 and the bottom probe 26b by the interval d2 between the two measurement positions adjacent to each other in the vertical direction, it is possible to measure the phase difference in all of the two measurement positions adjacent to each other in the vertical direction by moving the probe in the vertical direction by the interval d2 while maintaining the relative positional relationship.

The second phase calculation unit 17c calculates the phase of the radio signal at each measurement position from the phase difference calculated by the adjacent phase difference calculation unit 17b. Further, the second phase calculation unit 17c outputs the calculated value of the phase at each measurement position to the back projection processing unit 18.

Further, as shown in FIG. 21, the second phase calculation unit 17c may include a phase difference averaging unit 17e that averages a plurality of phase differences calculated by the adjacent phase difference calculation unit 17b for two adjacent measurement positions. In this case, the second phase calculation unit 17c calculates the phase of the radio signal at each measurement position from the phase difference averaged by the phase difference averaging unit 17e.

The amplitude averaging unit 17d outputs a value obtained by averaging the plurality of amplitudes measured at the respective measurement positions by the amplitude phase difference measurement unit 17a to the back projection processing unit 18. Although the amplitude averaging unit 17d can be omitted, the calibration system 2 can calculate the amplitude value more accurately when the amplitude averaging unit 17d is provided.

The far field directivity calculation unit 21 is adapted to calculate the directivity of the far field, by using the positional information of each probe output from the scan control unit 14, the value of the amplitude measured by the amplitude phase difference measurement unit 17a (or the value of the amplitude averaged by the amplitude averaging unit 17d), and the value of the phase calculated by the second phase calculation unit 17c.

Figure 22:
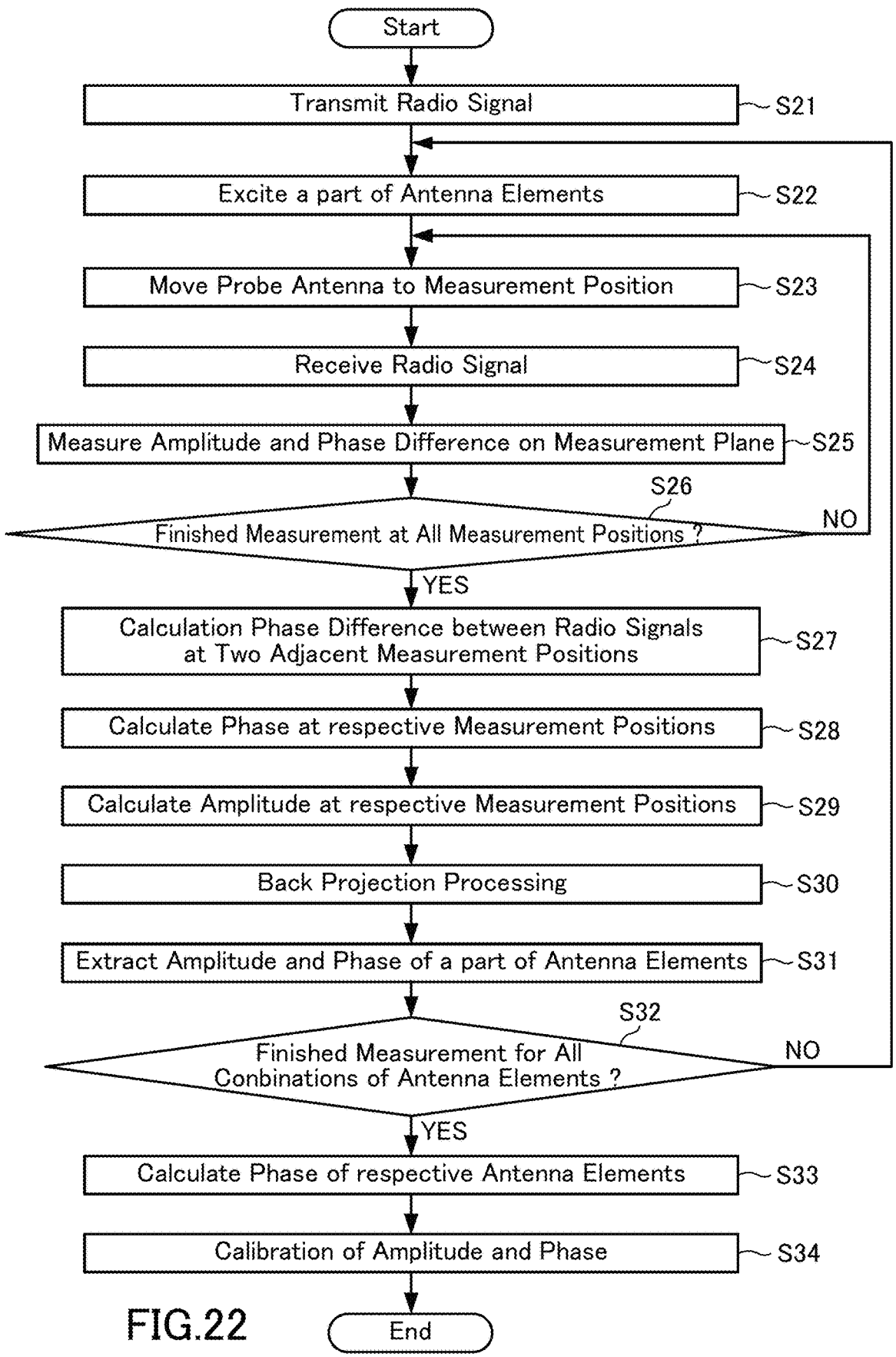
FIG. 22 is a flowchart showing a process of a calibration method using a calibration system according to a second embodiment of the present invention.
Figure 23:
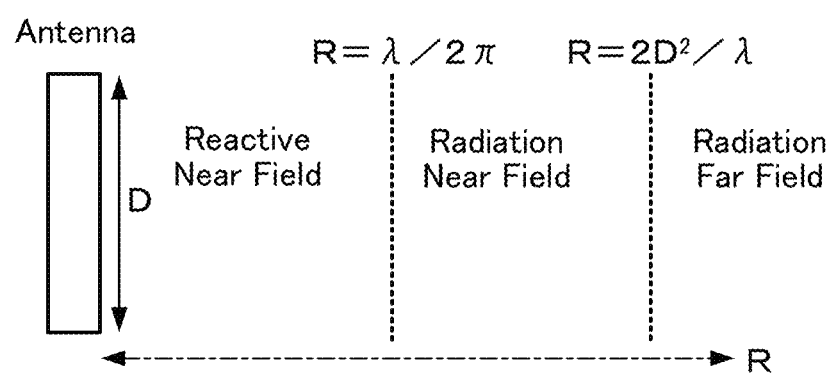
FIG. 23 is an explanatory diagram of a measurement area of an antenna.

Hereinafter, a calibration method using the calibration system 2 according to the present embodiment will be described with reference to a flowchart of FIG. 22.

First, the measured antenna 100 transmits a radio signal (step S21).

Next, the antenna control unit 16 excites a part of antenna elements apart from each other by a predetermined interval or more from among the plurality of antenna elements T1 to TN included in the measured antenna 100 (antenna control step S22).

Next, the scan control unit 14 causes the probe scan mechanism 13 to move the plurality of probes of the probe antenna 26 to the measurement positions in the measurement plane P (probe scanning step S23).

Next, the plurality of probes of the probe antenna 26 receive the radio signals output from the part of the antenna elements excited in the antenna control step S22 at the measurement position moved in the probe scanning step S23 in the near field area (reception step S24).

Next, the amplitude phase difference measurement unit 17a measures the phase difference between the radio signals received by two adjacent probes in the horizontal direction or the vertical direction of the plurality of probes of the probe antenna 26. Further, the amplitude phase difference measurement unit 17a measures the amplitude of the radio signal received by the plurality of probes of the probe antenna 26 (step S25).

Next, the control unit 24 determines whether or not the values of the phase difference and the amplitude have been obtained at all measurement positions in the measurement plane P (step S26). In the case of a negative determination, the procedure returns to the probe scanning step S23. In the case of a positive determination, the process proceeds to step S27.

In step S27, the adjacent phase difference calculation unit 17b calculates the phase difference between the radio signals at the two adjacent measurement positions from the phase difference measured in step S25 (step S27).

Next, the second phase calculation unit 17c calculates the phase of the radio signal at each measurement position from the phase difference calculated in step S27 (step S28).

In the case that the second phase calculation unit 17c includes the phase difference averaging unit 17e, the second phase calculation unit 17c averages the plurality of phase differences at the two adjacent measurement positions by the phase difference averaging unit 17e in the step S28. It should be noted that the averaging process by the phase difference averaging unit 17e can be omitted in step S28.

Next, in the case that the amplitude phase measurement unit 17 includes the amplitude averaging unit 17d, the amplitude averaging unit 17d averages the plurality of amplitudes measured at the respective measurement positions in step S25 (step S29). In the case that the amplitude phase measurement unit 17 does not include the amplitude averaging unit 17d, the amplitude phase difference measurement unit 17a outputs the amplitude measured in step S25.

The processes of steps S25, S27 to S29 constitute an amplitude phase measurement step.

Next, based on the amplitude and the phase measured in steps S28 and S29, the back projection processing unit 18 calculates the amplitude distribution of the radio signal transmitted from the part of the antenna elements on the electromagnetic radiation surface 100a of the measured antenna 100, and calculates the phase distribution (back projection process step S30).

Next, from the amplitude distribution and the phase distribution calculated in the back projection processing step S30, the amplitude phase extraction unit 19 extracts amplitude and phase values corresponding to the positions of the part of antenna elements on the electromagnetic radiation surface 100a (amplitude phase extraction step S31).

Next, the control unit 24 determines whether or not the amplitude distribution and the phase distribution are obtained for all combinations of the antenna elements T1 to TN as shown in FIGS. 8 to 12 (step S32). In the case of a negative determination, the process returns to the antenna control step S22. In the case of a positive determination, the process proceeds to step S33.

In step S33, the first phase calculation unit 20 calculates the phase corresponding to the respective positions of the plurality of antenna elements T1 to TN on the plane electromagnetic radiation surface 100a, from the values of the phases extracted in the amplitude phase extraction step S31 for all the combinations of the antenna elements T1 to TN (first phase calculation step S33).

Next, the phase control unit 16b controls the phase adjustment amount by the variable phase shifters 103-1 to 103-N, in accordance with the difference between the phases calculated for respective antenna elements T1 to TN in the first phase calculation step S33 and the predetermined desired values of the phase for respective the antenna elements T1 to TN. Further, the amplitude control unit 16c controls the amplitude adjustment amount by the variable amplifiers 104-1 to 104-N, in accordance with the difference between the amplitude extracted for the respective antenna elements T1 to TN in the amplitude phase extraction step S31 and the predetermined desired value of the amplitude for the respective antenna elements T1 to TN (step S34).

As described above, the calibration system 2 according to the present embodiment is configured such that, with respect to the radio signal transmitted from the measured antenna 100 integrated with the RF circuit, the phase and the amplitude can be measured in the near field without supplying the synchronization signal from the measured antenna 100. Therefore, similar to the first embodiment, the calibration system 2 according to the present embodiment can measure the amplitude and the phase of the radio signal on the electromagnetic radiation surface 100a of the measured antenna 100, even in the case where the interval between the antenna elements T1 to TN is narrow with respect to the wavelength of the radio signal transmitted from the plurality of antenna elements T1 to TN of the measuring antenna 100.

EXPLANATION OF REFERENCE NUMERALS 1, 2 Calibration system
11 Antenna support
12, 26 Probe antenna
13 Probe scan mechanism
14 Scan control unit
15 Signal generator
16 Antenna control unit
16a Element selection unit
16b Phase control unit
16c Amplitude control unit
17 Amplitude phase measurement unit
17a Amplitude phase difference measurement unit
17b Adjacent phase difference calculation unit
17c Second phase calculation unit
17d Amplitude averaging unit
17e Phase difference averaging unit
18 Back projection processing unit
19 Amplitude phase extraction unit
20 First phase calculation unit
26c1, 26c2, 26l, 26r, 26t, 26b Probe
27 Antenna support unit
28 Change-over switch
100 Measured antenna
100a Electromagnetic radiation surface
101 Distributor
102-1 to 102-N SW
103-1 to 103-N Variable phase shifter
104-1 to 104-N Variable amplifier
105 RF circuit
T1 to TN Antenna element

The invention claimed is:

1. A calibration system, comprising:
a probe antenna that receives a radio signal at a plurality of measurement positions set on a predetermined measurement plane in a near field area of a measured antenna having a plurality of antenna elements;
an amplitude phase measurement unit that measures amplitude and phase of the radio signal received by the probe antenna; and
a back projection processing unit that calculates an amplitude distribution and a phase distribution of the radio signal on the electromagnetic radiation surface of the measured antenna based on the amplitude and the phase measured by the amplitude phase measurement unit, wherein
the calibration system further comprises an antenna control unit that selects and excites one combination of antenna elements from among the plurality of antenna elements, and thereafter selects and excites another combination of antenna elements distinct from the one combination of the antenna elements,
the probe antenna receives the radio signal transmitted from the respective combinations of the antenna elements,
the back projection processing unit calculates the amplitude distribution and the phase distribution of the radio signals transmitted from the respective combinations of the antenna elements, and
the calibration system further comprises:
an amplitude phase extraction unit that extracts values of the amplitude and the phase corresponding to the positions of the respective combinations of the antenna elements on the electromagnetic radiation surface, from the amplitude distribution and the phase distribution calculated by the back projection processing unit; and
a first phase calculation unit that calculates the phase corresponding to the respective positions of the plurality of the antenna elements on the electromagnetic radiation surface, from the values of the phase extracted by the amplitude phase extraction unit.

2. The calibration system according to claim 1, wherein the probe antenna includes a plurality of probes: a first probe; a second probe and a third probe arranged to sandwich the first probe in a horizontal direction within the measurement plane; a fourth probe; a fifth probe and a sixth probe arranged to sandwich the fourth probe in a vertical direction within the measurement plane,
the amplitude and phase measurement unit includes:
an amplitude phase difference measurement unit that measures the phase difference between the radio signals received by the plurality of probes, and measures the amplitude of the radio signals received by the plurality of probes;
an adjacent phase difference calculation unit that calculates a phase difference between the radio signals at two adjacent measurement positions, from the phase difference measured by the amplitude phase difference measurement unit; and
a second phase calculation unit that calculates the phase of the radio signal at the respective measurement positions, from the phase difference calculated by the adjacent phase difference calculation unit, the distance between the center of the first probe and the center of the second probe in the measurement plane is longer than the distance between the center of the first probe and the center of the third probe in the measurement plane, by the interval d1 between two measurement positions adjacent to each other in the horizontal direction, and the distance between the center of the fourth probe and the center of the fifth probe in the measurement plane is longer than the distance between the center of the fourth probe and the center of the sixth probe in the measurement plane, by the interval d2 between two measurement positions adjacent to each other in the vertical direction.

3. The calibration system according to claim 2, wherein any one of the first probe, the second probe, and the third probe serves as any one of the fourth probe, the fifth probe, and the sixth probe.

4. The calibration system according to claim 1, wherein the measured antenna includes an amplitude phase adjustment unit that adjusts the amplitude and phase of the radio signal transmitted from the respective antenna elements on the electromagnetic radiation surface of the measured antenna, the antenna control unit includes:

an amplitude control unit that controls an amplitude adjustment amount by the amplitude phase adjustment unit, in accordance with a difference between the amplitude extracted by the amplitude phase extraction unit and a predetermined desired value of the amplitude; and a phase control unit that controls a phase adjustment amount by the amplitude phase adjustment unit, in accordance with a difference between the phase calculated by the first phase calculation unit and a predetermined desired value of the phase.

5. The calibration system according to claim 1, wherein an interval between radiation sources of the combination of the antenna elements selected by the antenna control unit is set to be longer than half wave length of the radio signal transmitted from each of the antenna elements.

6. The calibration system according to claim 1, wherein between the antenna elements in the one combination of the antenna elements selected by the antenna control unit, there exists either one of the antenna elements in the another combination of the antenna elements to be subsequently selected by the antenna control unit.

7. The calibration system according to claim 1, wherein when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

8. The calibration system according to claim 2, wherein the measured antenna includes an amplitude phase adjustment unit that adjusts the amplitude and phase of the radio signal transmitted from the respective antenna elements on the electromagnetic radiation surface of the measured antenna, the antenna control unit includes:

an amplitude control unit that controls an amplitude adjustment amount by the amplitude phase adjustment unit, in accordance with a difference between the amplitude extracted by the amplitude phase extraction unit and a predetermined desired value of the amplitude; and a phase control unit that controls a phase adjustment amount by the amplitude phase adjustment unit, in accordance with a difference between the phase calculated by the first phase calculation unit and a predetermined desired value of the phase.

9. The calibration system according to claim 3, wherein the measured antenna includes an amplitude phase adjustment unit that adjusts the amplitude and phase of the radio signal transmitted from the respective antenna elements on the electromagnetic radiation surface of the measured antenna, the antenna control unit includes:

an amplitude control unit that controls an amplitude adjustment amount by the amplitude phase adjustment unit, in accordance with a difference between the amplitude extracted by the amplitude phase extraction unit and a predetermined desired value of the amplitude; and a phase control unit that controls a phase adjustment amount by the amplitude phase adjustment unit, in accordance with a difference between the phase calculated by the first phase calculation unit and a predetermined desired value of the phase.

10. The calibration system according to claim 9, wherein an interval between radiation sources of the combination of the antenna elements selected by the antenna control unit is set to be longer than half wave length of the radio signal transmitted from each of the antenna elements.

11. The calibration system according to claim 2, wherein between the antenna elements in the one combination of the antenna elements selected by the antenna control unit, there exists either one of the antenna elements in the another combination of the antenna elements to be subsequently selected by the antenna control unit.

12. The calibration system according to claim 3, wherein between the antenna elements in the one combination of the antenna elements selected by the antenna control unit, there exists either one of the antenna elements in the another combination of the antenna elements to be subsequently selected by the antenna control unit.

13. The calibration system according to claim 4, wherein between the antenna elements in the one combination of the antenna elements selected by the antenna control unit, there exists either one of the antenna elements in the another combination of the antenna elements to be subsequently selected by the antenna control unit.

14. The calibration system according to claim 10, wherein between the antenna elements in the one combination of the antenna elements selected by the antenna control unit, there exists either one of the antenna elements in the another combination of the antenna elements to be subsequently selected by the antenna control unit.

15. The calibration system according to claim 2, wherein when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

16. The calibration system according to claim 3, wherein when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

17. The calibration system according to claim 4, wherein when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

18. The calibration system according to claim 5, wherein when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

19. The calibration system according to claim 10, wherein when the plurality of antenna elements are arranged in a square lattice shape or a rectangular lattice shape, the antenna control unit selects the combination of antenna elements in: a combination of odd-numbered antenna elements in odd-numbered lines and even-numbered antenna elements in even-numbered lines; or a combination of even-numbered antenna elements in odd-numbered lines and odd-numbered antenna elements in even-numbered lines.

20. A calibration method, comprising:
an antenna control step to select and excite one combination of antenna elements from among a plurality of antenna elements of a measured antenna, and thereafter select and excite another combination of antenna elements distinct from the one combination of the antenna elements;
a reception step to receive a radio signal transmitted from each of the combination of antenna elements by a probe antenna, at a plurality of measurement positions set on a predetermined measurement plane in a near field area of the measured antenna, each time the combination of antenna elements selected in the antenna control step is switched;
an amplitude phase measurement step to measure amplitude and phase of the radio signal received by the reception step;
a back projection processing step to calculate an amplitude distribution and a phase distribution of the radio signal transmitted from each of the combination of the antenna elements on an electromagnetic radiation surface of the measured antenna, based on the amplitude and the phase measured by the amplitude phase measurement step;
an amplitude phase extraction step to extract amplitude and phase values corresponding to position of each of the combination of the antenna elements on the electromagnetic radiation surface, from the amplitude distribution and the phase distribution calculated by the back projection processing step; and
a first phase calculation step to calculate phases corresponding to respective positions of the plurality of antenna elements on the electromagnetic radiation surface, from the phase values extracted by the amplitude phase extraction step.

* * * * *